(12) United States Patent
Dhandhania et al.

(10) Patent No.: US 11,900,169 B1
(45) Date of Patent: Feb. 13, 2024

(54) INFERENCE FLOW ORCHESTRATION SERVICE

(71) Applicant: Amazon Technologies, Inc., Seattle, WA (US)

(72) Inventors: Anand Dhandhania, Seattle, WA (US); Thomas Loockx, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 485 days.

(21) Appl. No.: 17/230,784

(22) Filed: Apr. 14, 2021

(51) Int. Cl.
*G06F 9/46* (2006.01)
*G06F 9/50* (2006.01)
*G06F 16/901* (2019.01)
*G06N 20/00* (2019.01)

(52) U.S. Cl.
CPC .......... *G06F 9/505* (2013.01); *G06F 16/9024* (2019.01); *G06N 20/00* (2019.01)

(58) Field of Classification Search
CPC .......... G06F 1/329; G06F 9/46; G06F 9/4843; G06F 9/485
See application file for complete search history.

(56) References Cited

U.S. PATENT DOCUMENTS

| | | | |
|---|---|---|---|
| 9,836,701 B2 | 12/2017 | Chen et al. | |
| 9,886,670 B2 | 2/2018 | Dirac et al. | |
| 10,102,480 B2 | 10/2018 | Dirac et al. | |
| 10,228,922 B2 | 3/2019 | Boehm et al. | |
| 10,235,681 B2 * | 3/2019 | Chang | G06F 40/237 |
| 2019/0236485 A1 | 8/2019 | Stanley, III et al. | |
| 2019/0378052 A1 | 12/2019 | Badhwar et al. | |
| 2020/0219007 A1 | 7/2020 | Byers et al. | |
| 2021/0182729 A1 * | 6/2021 | George | G06F 9/5077 |
| 2022/0253488 A1 * | 8/2022 | Li | G06N 3/045 |

OTHER PUBLICATIONS

U.S. Appl. No. 17/116,005, filed Dec. 9, 2020, Sunny Dasgupta, et al.

* cited by examiner

*Primary Examiner* — Andy Ho
(74) *Attorney, Agent, or Firm* — Robert C. Kowert; Kowert, Hood, Munyon, Rankin & Goetzel, P.C.

(57) ABSTRACT

Descriptors of machine learning tasks to be used to respond to analysis requests, indicating acceptable categories of runtime environments for the tasks and metrics to be collected from the tasks, are received via programmatic interfaces. In response to an analysis request, an orchestrator receives results from individual tasks as they become available, provides the results to other tasks, and causes a response to the request to be prepared using results from at least a subset of the tasks. Metrics collected from the tasks, and a visual representation of the tasks indicating their runtime environments are presented.

20 Claims, 12 Drawing Sheets

INFERENCE FLOW ORCHESTRATION SERVICE

BACKGROUND

Many modern computing applications employ machine learning algorithms and models. Deep learning models, which typically include numerous hidden neural network layers at which values of thousands (or even millions) of model parameters are learned, have been used for generating inferences with in a wide variety of application domains including object recognition, text analysis, video analysis, game playing, time series prediction and the like. Sophisticated machine learning models can be trained and run efficiently on servers equipped with graphics processing units (GPUs) and/or other special-purpose chips designed specifically for machine learning computations, enabling models of very high complexity to be used behind the scenes for a variety of end user applications.

For some types of applications, multiple machine learning models may have to be utilized together. For example, for extracting content from images or scans of documents, lower-level character recognition models may be used, lower-level table recognition models may be used, and so on. Different data scientists may have the domain expertise needed for coding and testing respective sets of models, so the models for lower-level inferences needed to solve a larger problem may sometimes be developed somewhat independently of one another.

In many cases, a designer of a given machine learning model may not necessarily be aware of all the other models which may use the inference results of the designer's model, the runtime environments at which such other models may be executed, or how exactly the inference results should be transferred to the other models (or received as input from a different model). For example, a given deep learning model for word or token recognition may be combined with one set of models for analysis of documents in a first format, and with another set of models for analysis of documents in a different format. Managing the flow of inference results in scenarios in which a variety of machine learning artifacts may potentially have to be combined in different ways remains a challenging technical problem.

Figure 1:
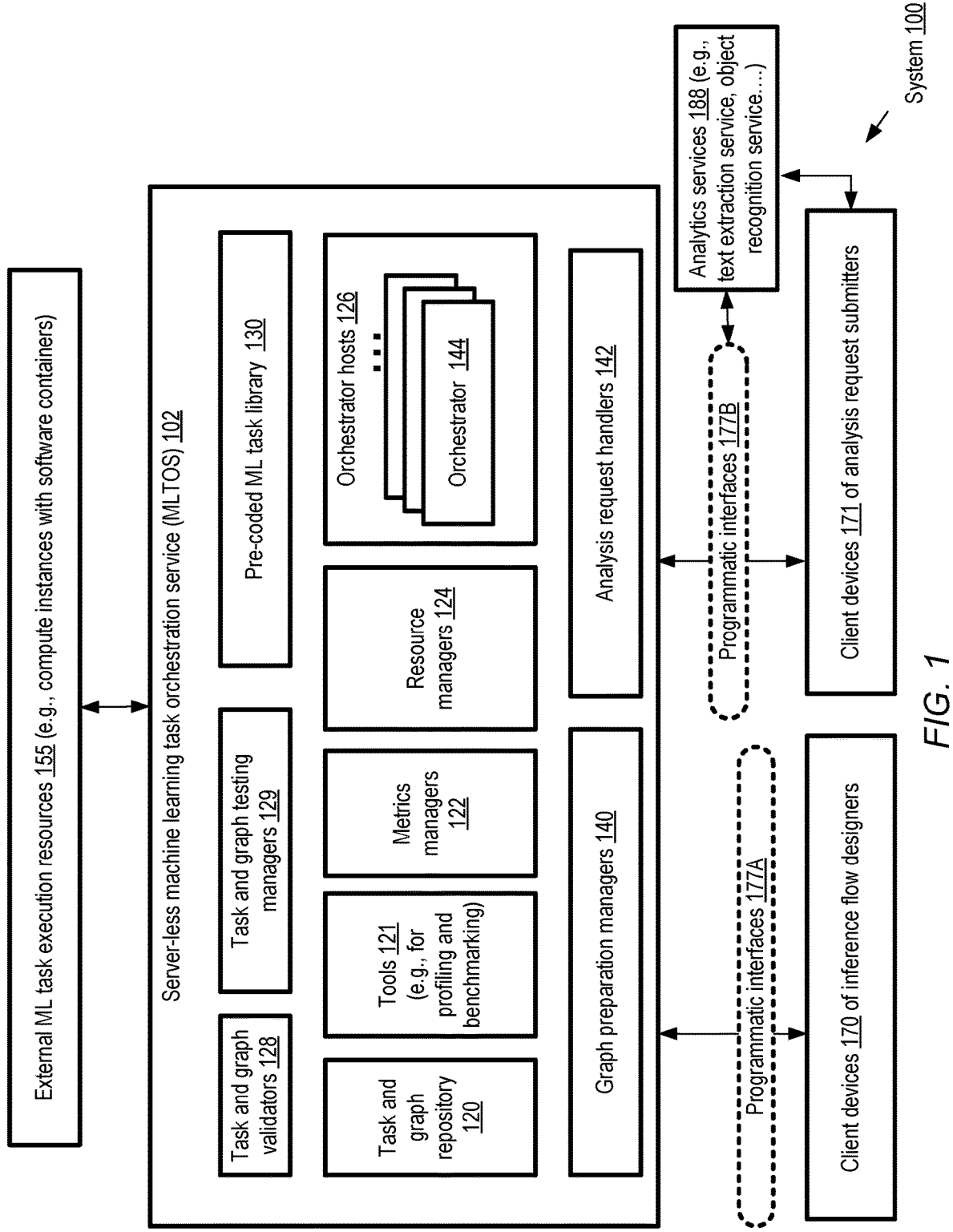
FIG. 1 illustrates an example system environment in which a server-less machine learning task orchestration service may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for coordinating the execution of multiple machine learning related tasks which may be utilized together to respond to analysis requests, without requiring the designers of the machine learning models used to provide code for selecting specific resources to be used for individual tasks, transferring inference results between tasks, parallelizing the execution of tasks where possible, managing failures of some tasks and the like. The flow of data between the tasks may be managed by orchestrators implemented at a machine learning task orchestration service (MLTOS). At a high level, the MLTOS may implement at least two types of functionality. Firstly, it may serve as an environment at which code for performing various types of machine learning tasks can be easily tested, stored and combined into graphs (referred to as inference graphs) for processing analysis requests, without requiring the designers/developers of the code to concern themselves with implementation details of scheduling the tasks relative to one another, configuring input/output mechanisms for transferring data between the tasks, etc. Secondly, the MLTOS may coordinate the execution of the inference graphs in response to synchronous and/or asynchronous analysis requests from end users, including by selecting runtime environments for implementing the constituent tasks of the graphs, finding opportunities for parallelism where possible and initiating parallel executions of tasks accordingly, responding to undesired delays or partial or complete failures of individual tasks and so on. As such, an MLTOS may have at least two categories of clients or users: inference flow designers (e.g., data scientists responsible for the preparation of machine learning models and/or other artifacts such as matrix/vector/tensor manipulation algorithms, feature generation algorithms etc. that are used for the machine learning tasks, and for indicating dependencies among the tasks) and analysis task requesters (end users of applications or services such as text extraction services, image analysis services, etc.). The MLTOS may provide a number of tools for preparing, testing, and monitoring the performance and other quality indicators of machine learning tasks and inference graphs. Inference graphs may also be referred to as inference flow graphs.

A given orchestrator of an MLTOS may, for example, comprise one or more processes or threads of execution at a server in some embodiments. An orchestrator may implement a set of programmatic interfaces used for communication with various machine learning task implementations. For a given analysis request, such as a request to extract the contents (words, tables, numeric values, key-value pairs, etc.) from a scanned or photographed document, an orchestrator may identify an inference flow graph to be executed, e.g., by using properties of the analysis request to perform a search in a database of graphs maintained at the MLTOS. The graph may comprise a plurality of nodes and a plurality of edges, with individual nodes corresponding to respective machine learning tasks, and respective edges representing dependencies between the tasks (e.g., a task T1 may be dependent on a task T2 if T1's expects input of a particular data type or format from T2). In the context of execution of inference flow graphs, the terms "inference flow graph node" and "machine learning task" may be used interchangeably herein, as a given node may typically represent a respective machine learning task; similarly, the terms "executing a node" and "executing a machine learning task" may be used interchangeably in the context of execution of a graph. Having identified a graph for the analysis request, the orchestrator may coordinate the execution of the graph as iterations of request-response interactions, with a given iteration comprising the orchestrator identifying the next set of one or more tasks that can be run in parallel, transmitting input to the nodes of the set, obtaining results from the nodes of the set, verifying the results for correctness or completeness, and then identifying the next set of tasks for the next iteration, until tasks corresponding to all the relevant nodes of the graph have been completed or at least attempted. Note that some inference flow graphs may comprise decision nodes or conditional nodes which select the set of successor nodes based on input received at the decision nodes, so not all the nodes of a given graph may necessarily be executed in at least some embodiments. In such scenarios, the nodes that are executed may be referred to as "relevant" nodes, while the nodes that are not executed may be referred to as "irrelevant" nodes. Some nodes of inference flow graphs may represent data transformation, feature generation and/or filtering, and may not necessarily involve execution of machine learning models.

The use of orchestrators may make it possible for inference flow designers to concentrate on the internal logic of the machine learning tasks, without having to manage resource acquisition or selection, parallelism, error or delay handling, and other types of coordination-related activities in various embodiments. In addition, metrics (such as latencies for obtaining inference results, the number of times a given task failed or timed out etc.) may be automatically collected from the different machine learning tasks in various embodiments at an MLTOS, presented to inference flow designers upon request, and analyzed for trends which may be used to make changes to runtime environments used for future analysis requests, or to select among different versions of a given graph node implementation.

As one skilled in the art will appreciate in light of this disclosure, certain embodiments may be capable of achieving various advantages, including some or all of the following: (a) speeding up the processing of various analysis requests requiring the use of multiple lower-level machine learning tasks, by automatically detecting opportunities for parallelism and then performing tasks in parallel, (b) reducing the overall amount of time taken to build machine learning-based services and applications, e.g., by enabling data scientists and engineers to focus on the logic of machine learning tasks instead of inter-task coordination, I/O or error handling, and/or (c) improving the quality of results obtained from such services and applications, e.g., by automatically trying out alternate versions of machine learning task implementations and selecting the implementations that work best for production use.

According to some embodiments, a system may comprise one or more computing devices. The computing devices may include instructions that upon execution on or across the one or more computing devices cause the one or more computing devices to obtain, e.g., via one or more programmatic interfaces of an MLTOS, respective descriptors of a plurality of machine learning tasks to be executed to respond to a content analysis request of a first category or type of content analysis requests (e.g., text analysis requests, video analysis requests, audio analysis requests, image analysis requests, or the like). The descriptors may be transmitted to the MLTOS by inference flow designers in some embodiments. Individual ones of the descriptors may include or indicate, for example (a) code for implementing the logic of the corresponding machine learning task, (b) input and output data types or signatures of the task, (c) one or more metrics to be collected with respect to the task, (d) one or more acceptable categories of runtime environments for executing the task (e.g., whether the task can be run within a single thread of an operating system process, whether a virtual machine such as a JVM (Java™ Virtual Machine) or a compute instance of a virtualized computing service can be used to implement the task, whether a software container can be used, etc.), and/or (e) one or more retry criteria for the machine learning task (e.g., indicating timeouts or other conditions in which the task should be re-run).

In various embodiments, dependencies between the tasks indicated in the descriptors may be determined. In some embodiments, resources at the MLTOS may examine the input and output signature information provided in the descriptors to match outputs of some tasks with inputs of others, and identify such input-output dependencies automatically without obtaining dependency information from the inference flow designers. In other embodiments, an inference flow designer may indicate such dependencies via programmatic interfaces, e.g., using predecessor and successor symbols or annotations of an inference flow definition language supported by the MLTOS. Using the dependency information, a graph representation of the machine learning tasks whose descriptors were obtained at the MLTOS may be generated and stored in some embodiments. The graph may comprise a plurality of nodes and a plurality of edges, with individual nodes representing respective machine learning tasks, and an edge linking a pair of nodes indicating that an output data type of the first node of the pair is compatible with an input data type of the second node of the pair (or that the first node's output is expected as input by the second node). In some embodiments, the graph may be a directed acyclic graph or DAG. In other embodiments, one or more parameterized cycles may be permitted in a graph, with the parameters of a given cycle for example indicating a maximum number of times that the tasks whose nodes are included in the cycle are to be executed.

The stored graph may be used by an orchestrator implemented at the MLTOS to respond to analysis requests in various embodiments, e.g., to automatically identify the set of machine learning tasks which can be started up and executed at least partly in parallel (without receiving guidance about the set of tasks that can be run in parallel), and to identify the set of tasks whose outputs are to be sent to other tasks. In response to determining that a particular content analysis request of a type/category for which the graph was generated has been received, e.g., from an end user of an application or a service being implemented with the help of the MLTOS, in various embodiments an orchestrator comprising one or more threads of execution may be caused to perform several different types of operations. The orchestrator may, for example, initiate execution of respective machine learning tasks represented by nodes in the graph and obtain a respective result from individual ones of the tasks. The runtime environment at which a given task is executed (which may be selected and/or instantiated by the orchestrator) may belong to a category of the acceptable categories indicated in the descriptor of the task in various embodiments. In at least some embodiments, an MLTOS may be referred to as a "server-less" service, in that clients on whose behalf the MLTOS is used may not have to acquire servers or other resources in advance. Instead, an orchestrator may dynamically select, e.g., from a pool of available resources of a provider network or cloud computing environment, respective resources to be used for individual runtime environments at which the tasks are run, without receiving an indication from a client that a particular resource is to be used for a particular task.

The orchestrator may, in at least some embodiments, be responsible for retrying failed tasks if needed—e.g., in response to determining that a result of a particular task satisfies a retry criterion indicated in its descriptor (e.g., if the particular task did not finish within a timeout interval indicated in the retry criteria, or did not produce a result satisfying a quality level indicated in the retry criterion), the task may be re-executed at the initiative of the orchestrator. The orchestrator may utilize the graph to identify a set of one or more tasks (referred to as successor tasks or dependent tasks) to which a result of a given task is to be provided as input in various embodiments. In some cases, the orchestrator may be able to identify multiple tasks which can be run in parallel, e.g., if they all are designed to process the same output from a predecessor task, or if input to a given task can be partitioned and processed using multiple instances or copies of that task.. The orchestrator may transmit, e.g., using network connections or other input/output channels created automatically by the MLTOS without receiving code for such connections/channels from clients, output from one set of tasks as input to a successor set of tasks in various embodiments. Finally, when tasks corresponding to all the relevant nodes of the graph have been performed (or at least attempted), the orchestrator may cause the overall response to the analysis request to be transmitted to one or more destinations (such as the source from which the analysis request was received, and/or a destination device or endpoint indicated in the analysis request) in at least some embodiments.

In at least some embodiments, an MLTOS may cause a visual representation of the graph used to respond to one or more analysis requests to be presented via one or more programmatic interfaces, e.g., to an inference flow designer or other interested party. The visual representation may indicate, for example, the particular types of runtime environments which were used during the processing of the request(s). Note that in at least some cases, some tasks of a graph may be implemented using a different types of runtime environment than others—e.g., one task may be implemented as a thread of a process running on the same host as the orchestrator, while another task may be implemented using a software container executed at a compute instance of a virtualized computing service. In at least some embodiments, an indication of metrics collected by the MLTOS (e.g., the kinds of metrics indicated in the task descriptors, and/or default metrics defined by the MLTOS such as latencies, number of bytes received and transmitted, etc.) for some or all of the tasks of the executed inference graph may be presented via programmatic interfaces as well. Such metrics may include, for example, response times/latencies for completing machine learning tasks, resource utilization levels at the runtime environments used, the number of bytes transferred, confidence levels of inferences generated, inference quality metrics, or the like. In at least some embodiments, retry statistics (e.g., how often a given task of the graph had to be retried) may be collected and presented via the programmatic interfaces as well.

A given inference graph may comprise more than one type of node in some embodiments, as suggested earlier. Some nodes may represent inference tasks (e.g., execution of one or more trained machine learning models, such as deep learning models including convolutional neural networks, recurrent neural networks, etc.). Other nodes may represent non-inference computations such as matrix inversions or transformations, vector or tensor manipulations, feature extraction operations, etc., indicated by the inference flow designers. Some nodes may be used for dynamic condition evaluation or decision making (e.g., whether a particular intermediate result of the graph should be transmitted to node X or node Y within the graph) in at least one embodiment. In some embodiments, a given node may be used as a representation or proxy of an entire graph—that is, within a given graph G1, all the logic of a different graph G2 may in effect be embedded or contained within a single node N1.

According to some embodiments, an orchestrator may be responsible (e.g., based on programmatic input received from inference flow designers) for trying out multiple versions or implementations of a given machine learning task. For example, an indication of a plurality of versions V1, V2, V3 etc. of a first machine learning task T1 represented as a node in a graph G1 may be obtained at the MLTOS. The orchestrator selected for a given request for which G1 is to be executed may provide a first copy C1 of the input for T1 to version V1 running at one runtime environment RTE1, a second copy C2 of the input for T1 to version V2 running at one runtime environment RTE2, a third copy C3 of the input for T1 to version V3 running at one runtime environment RTE3, and so on. Based on an analysis of result quality metrics obtained from the different versions, one of the versions (e.g., V2) may be chosen as a primary version to be used for additional analysis requests in some embodiments.

In some embodiments, the MLTOS may provide a library of pre-generated machine learning task implementations and/or inference graphs which can be re-used by authorized clients. Using such a library, graphs which combine pre-created tasks in novel ways may be created and used for new applications and services in various embodiments.

In one embodiment, an orchestrator may use one or more factors to determine whether a set of tasks indicated in a graph should be run in parallel, and cause the tasks to be run at least partly concurrently if a determination to run them in parallel is made. For inter-task parallelism to be supported for a pair of tasks, for example, in some embodiments the MLTOS may have to analyze the logic or code of the tasks to ensure that they satisfy the semantics of "pure functions", that is, that they do not have side effects. A decision as to whether a given task is side-effect-free or has pure function semantics may be made at the time that the task descriptor is obtained in some embodiments, e.g., using code analysis tools and/or test executions of the tasks during which input/output operations are traced. Two pure function tasks may be run in parallel in some embodiments of they both consume input from the same set of predecessor tasks if the graph (i.e., tasks from whose nodes edges lead to each of the two pure function tasks), or if both tasks consume the initial input records indicated in an analysis request. In some embodiments, another type of parallelism may be detected and coordinated by an orchestrator. In such embodiments, if the output from one task T1 represented by a node of a graph G1 comprises a plurality of objects Obj1, Obj2 etc., of the same data type, that set of objects may be partitioned and processed at respective instances or copies of tasks T2-inst1, T2-inst2, etc., of another node of G1. For example, instead of sending Obj1, Obj2, etc., all to a single instance of T1, Obj1 may be sent to T2-inst1, Obj2 may be sent to T2-inst2, etc. The orchestrator may contain logic to recognize when such opportunities to partition input for multiple instances of tasks arise, and to start up the multiple instances as needed in some embodiments.

According to some embodiments, the MLTOS may be implemented as a subcomponent of a more general machine learning service or analytics service at a provider network. The term "provider network" (sometimes simply called a "cloud") refers to a large pool of network-accessible computing resources (such as compute, storage, and networking resources, applications, and services), which may be virtualized or bare-metal. The cloud can provide convenient, on-demand network access to a shared pool of configurable computing resources (e.g.. including resources at which software containers used for running instrumented machine learning models are executed) that can be programmatically provisioned and released in response to customer commands. These resources can be dynamically provisioned and reconfigured to adjust to variable load. The resources of a provider network may in some cases be distributed across multiple data centers, which in turn may be distributed among numerous geographical regions (e.g., with each region corresponding to one or more cities, states or countries). For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network). A provider network may include numerous network-accessible services, such as a virtualized computing service (VCS), one or more storage services, database services and the like, as well as a machine learning service (which may also be referred to as an analytics service) comprising the MLTOS. In some embodiments, an MLTOS may be implemented as a separate service from a more general machine learning service of a provider network. A VCS may also be referred to as an elastic compute service, virtual machines service, computing cloud service, compute engine, and/or cloud compute in various implementations. Programmatic interfaces of the machine learning service or MLTOS may be used by clients to submit task descriptors, analysis requests, and so on in at least some embodiments.

Example System Environment

FIG. 1 illustrates an example system environment in which a server-less machine learning task orchestration service may be implemented, according to at least some embodiments. As shown, system 100 comprises resources and artifacts of server-less machine learning task orchestration service (MLTOS) 102, including for example graph preparation managers 140, analysis request handlers 142, a set of orchestrator hosts 126 at which a plurality of orchestrators 144 are implemented, task and graph validators 128, task and graph testing managers 129, a pre-coded machine learning (ML) task library 130, a task and graph repository 120, a set of tools 121, metrics managers 122 and resource managers 124 in the depicted embodiment. Individual ones of the subcomponents of MLTOS 102 may be implemented using some combination of hardware and software at one or more computing devices.

The MLTOS 102 may implement at least two types of programmatic interfaces in the depicted embodiment, which may be used by respective sets of clients to submit requests to the MLTOS and receive corresponding responses. Programmatic interfaces 177A may be used by inference flow designers to submit requests and messages pertaining to the creation, definition and testing of machine learning tasks and inference graphs which each represent some combination of the tasks, e.g., from client devices 170. Programmatic interfaces 177B may be used by end users of analytics applications and services 188, such as text content extraction services, image analysis services (usable to identify entities, objects, faces, and/or text etc. within images), video analysis services (usable to identify entities, objects, faces, actions, and/or text within videos), audio analysis services (usable to identify spoken utterances, song lyrics, singers/musicians/artists heard in the audio, etc.) and the like to submit analysis requests which are processed with the help of orchestrators 144 and graphs in the depicted embodiment. In some embodiments end users of such services may send their requests to the respective analytics services 188 from client devices 171, and the analytics services 188 may utilize programmatic interfaces 177B to perform the requested analysis using orchestrators and flow inference graphs. Programmatic interfaces 177 may each comprise, for example, one or more web-based consoles, graphical user interfaces, command-line tools, application programmatic interfaces and the like. The client devices 170 and 171 may, for example, from which requests or messages are transmitted to the MLTOS may include, for example, laptops, desktops, portable/mobile computing devices, phones and the like in some embodiments. Analysis requests may also be submitted from augmented reality/virtual reality devices, wearable devices, dialog-driven personal assistant devices, and the like in some embodiments.

Inference flow designers, such as data scientists or engineers involved in the development and deployment of machine learning-based services or applications, may utilize programmatic interfaces 177A to provide and obtain information about individual machine learning tasks (such as inference tasks performed using machine learning models, non-inference tasks which involve computations on matrices, vectors, tensors and the like but do not use machine learning models per se, etc.) and/or graphs which can be constructed from such machine learning tasks in the depicted embodiment. One or more graph preparation managers 140 may be responsible for receiving descriptors of individual machine learning tasks and/or inference graphs comprising multiple tasks from the client devices 170, and strong representations of the tasks and graphs in repository 120. For example, in some embodiments, respective task descriptors may be submitted by inference flow designers for each of several machine learning tasks which may collectively be used to response to an analysis request. A given task descriptor may include, for example, code (or a pointer to the code) for implementing the task's logic of the corresponding machine learning task, an indication of input and output data types/formats/signatures of the task, and an indication of one or more runtime environments at which the task can be run (such as whether a user-mode process or thread running at the same orchestrator host 126 as the orchestrator 144 selected for the task should be used, whether an external ML task execution resource 155 such as a compute instance with a software container should be used, etc.). In some embodiments, the task descriptor may for example include versions of code for several different runtime environments. In at least one embodiment, a task descriptor may indicate one or more metrics to be collected during execution of the task, e.g., in addition to or instead of a default set of metrics collected for all tasks by the MLTOS. In some embodiments, retry criteria for a task (e.g., indicating timeouts or other conditions in which the task should be re-run) and/or exception-handling or error-handling logic may be specified for at least some tasks in respective descriptors. Note that not all elements may be required to be present within a given descriptor of a machine learning task in some embodiments. For example, if an inference flow designer does not specify preferred runtime environments for a task, a graph preparation manager may select a runtime environment category for the task based on MLTOS defaults or based on an estimate of the complexity of the task obtained by analyzing its code.

In some embodiments, machine learning task dependency information may be provided via programmatic interfaces 177A to the MLTOS. In other embodiments, a graph preparation manager may be able to infer dependencies among tasks, e.g., based on matching output data types/signatures with input data types/signatures. Using the dependency information, in at least some embodiments graphs whose nodes correspond to individual machine learning tasks to be used for a given category of analysis request, and whose edges represent dependencies among the tasks, may be constructed by graph preparation managers 140 and stored in task and graph repository 120. In some embodiments, in addition to providing descriptors of individual machine learning tasks, inference flow designers may provide descriptors of the graphs.

In various embodiments, individual tasks and/or graphs which include combinations of the tasks may be validated at the MLTOS before they are accepted and stored, e.g., by task and graph validators 128. The validation operations performed may include, for example, verifying that the code for a given task is able to accept input of the type indicated in its descriptor, produce output of the type indicated in its descriptor, and so on. Validation tests for graphs may comprise combinations of validation tests for the constituent tasks represented in the graph's nodes in some embodiments. In at least one embodiment, the validators may also determine whether a given task is side-effect free, e.g., that the execution of the task does not result persistent changes to external data which can be accessed from other tasks. If a task is determined to be free of side effects, it may be classified as a pure function, and such classifications may be used to decide whether a given set of tasks can be run in parallel in at least some embodiments. For example, only side-effect-free tasks may be run concurrently in some embodiments by an orchestrator 144.

In at least some embodiments, the MLTOS 102 may provide programmatic interfaces 177A enabling clients to test individual tasks and/or graphs, e.g., by instantiating runtime environments and executing the tasks for some specified test inputs. Task and graph testing managers 129 may respond to such testing requests from clients in the depicted embodiment by running the specified tests, and provide results of the tests to the clients.

According to various embodiments, MLTOS 102 may provide access to a library 130 comprising a collection of pre-coded ML tasks to authorized clients via programmatic interfaces 177A. For example, a group of data scientists working for the same organization or collaborating organizations may share their code for various ML tasks, e.g., by indicating the set of clients who are to be allowed to view and/or use the code for a given task. In some cases, such pre-coded tasks may be reused as is, or used as a starting point for new implementations of machine learning tasks by authorized clients. In at least some embodiments, an MLTOS may provide a variety of tools 121 for analyzing and/or debugging individual tasks and/or inference flow graphs, such as profilers (which can be used to view the amount of time and/or resources consumed in different parts of a task's program code), benchmarking tools (which can be used to run systematic performance tests on tasks and graphs), and so on. Results provided from such tools may be used by inference flow designers to find and remove problems to enhance their code, and provide new or alternative versions of machine learning task implementations to the MLTOS in various embodiments.

Analysis request handlers 142 may receive requests of various types from end users of a variety of machine learning-based applications/services via programmatic interfaces 177B in the depicted embodiment. Depending for example on the parameters/properties of a given request, such as the type of analysis requested, the client from which the request is received, and so on, an orchestrator 144 may be identified by the analysis request handler for a given request in the depicted embodiment. In some embodiments, a pool of orchestrators may be set up in advance at one or more orchestrator hosts 126 (e.g., virtual or physical servers maintained at the MLTOS) for one or more types of analysis requests, and one such orchestrator may be identified or selected by an analysis request handler for a given received request. In other embodiments, orchestrators may be instantiated on demand, e.g., one or more processes or threads implementing the orchestrator for a given type of request may be started up after a request is received and its type is identified. In at least one embodiment, a respective set of orchestrators may be utilized for each category of analysis request—e.g., one set of orchestrators may be used for requests to extract content from images/scans of text documents, another orchestrator may be used for requests to identify entities within images, and so on. In other embodiments, request-category-agnostic orchestrators may be used, so that a single orchestrator may be used to process requests for text analysis, image analysis and the like. In some embodiments, inference flow designers may submit at least a portion of the code to be used to implement an orchestrator for a particular category of analysis request.

The orchestrator identified for a received analysis request may obtain the inference graph which is to be used for processing the request from repository 120 in the depicted embodiment, e.g., based on a search request whose parameters include at least a portion of the request message submitted by the client via interfaces 177B. The orchestrator may then start execution of an instance of the graph, by iteratively identifying the subset of nodes of the graph whose tasks can next be run (e.g., tasks whose input, comprising output collected from other tasks, is available from the orchestrator), instantiating that set of tasks at respective runtime environments in accordance with the tasks' descriptors, transmitting input to that set of tasks, waiting for the results/outputs from that set of tasks, handling any errors or retry conditions that may have been met, and then repeating the process for the next set of nodes until tasks for all the relevant nodes of the graph have been executed in the depicted embodiment. In some cases, external ML task execution resources 155 may be selected by the orchestrator for at least some of the tasks based on the descriptors of the tasks. Other tasks may be run at runtime environments on the orchestrator host 126 of the orchestrator, and/or using network-accessible services of a provider network or cloud computing environment in some cases. Different tasks of a given inference graph may be run at runtime environments of different categories in some embodiments as needed—e.g., a relatively simple task may be run at a thread of a process at the orchestrator host, while a more complex task of the same graph may be executed at an external resource 155.

In at least some embodiments a visual representation of a graph used to process a given analysis request or a set of analysis requests, indicating the different nodes whose tasks were implemented, the order in which the tasks were implemented (including indications of parallel or concurrent executions), and/or the respective categories of runtime environments utilized for the nodes may be provided by the MLTOS to clients, e.g., via programmatic interfaces 177A. In at least some embodiments, indications of the metrics collected from various tasks for one or more analysis requests, and/or retry statistics indicative of the number of tasks which were re-executed in accordance with their respective retry criteria for the analysis requests, may also or instead be provided via programmatic interfaces 177A. Such visualizations and metrics may help designers improve their machine learning task implementations in various embodiments.

According to some embodiments, the specific resources (e.g., hosts of the MLTOS 102, external ML task execution resources, etc.) to be used for the runtime environments for the tasks of an inference flow graph may be selected by resource managers 124. In one embodiment, for example, in addition to the orchestrator hosts themselves, the MLTOS may comprise a pool of additional hosts which can be used to run machine learning tasks, or the MLTOS may proactively acquire a pool of compute instances of a virtualized computing service for running machine learning tasks. In some embodiments the resource managers 124 may dynamically increase or decrease the size of such pools, based for example on analysis of trends of the rates of analysis requests processed at the MLTOS.

A variety of metrics may be collected during the orchestrated execution of the flow graphs, including for example per-task metrics (as specified in the task descriptors stored in task and graph repository 120, latencies, retry rates etc.), graph-level metrics (e.g., the response time for responding to individual analysis requests, the number of graph executions that failed or did not complete before an expected time period, and so on), resource utilization levels of the orchestrator hosts and other task execution resources, and so on. Such metrics may be collected and analyzed by metrics managers 122 in various embodiments, and provided to inference flow designer clients of the MLTOS in response to programmatic requests. In some embodiments, inference quality metrics (e.g., confidence levels associated with recognition of text, objects and the like) may also be collected by metrics managers and provided to interface flow designers; such metrics may for example be used to initiate preparation of improved versions of the machine learning task implementations.

Example Machine Learning Tasks Corresponding to an Analysis Request

Figure 2:
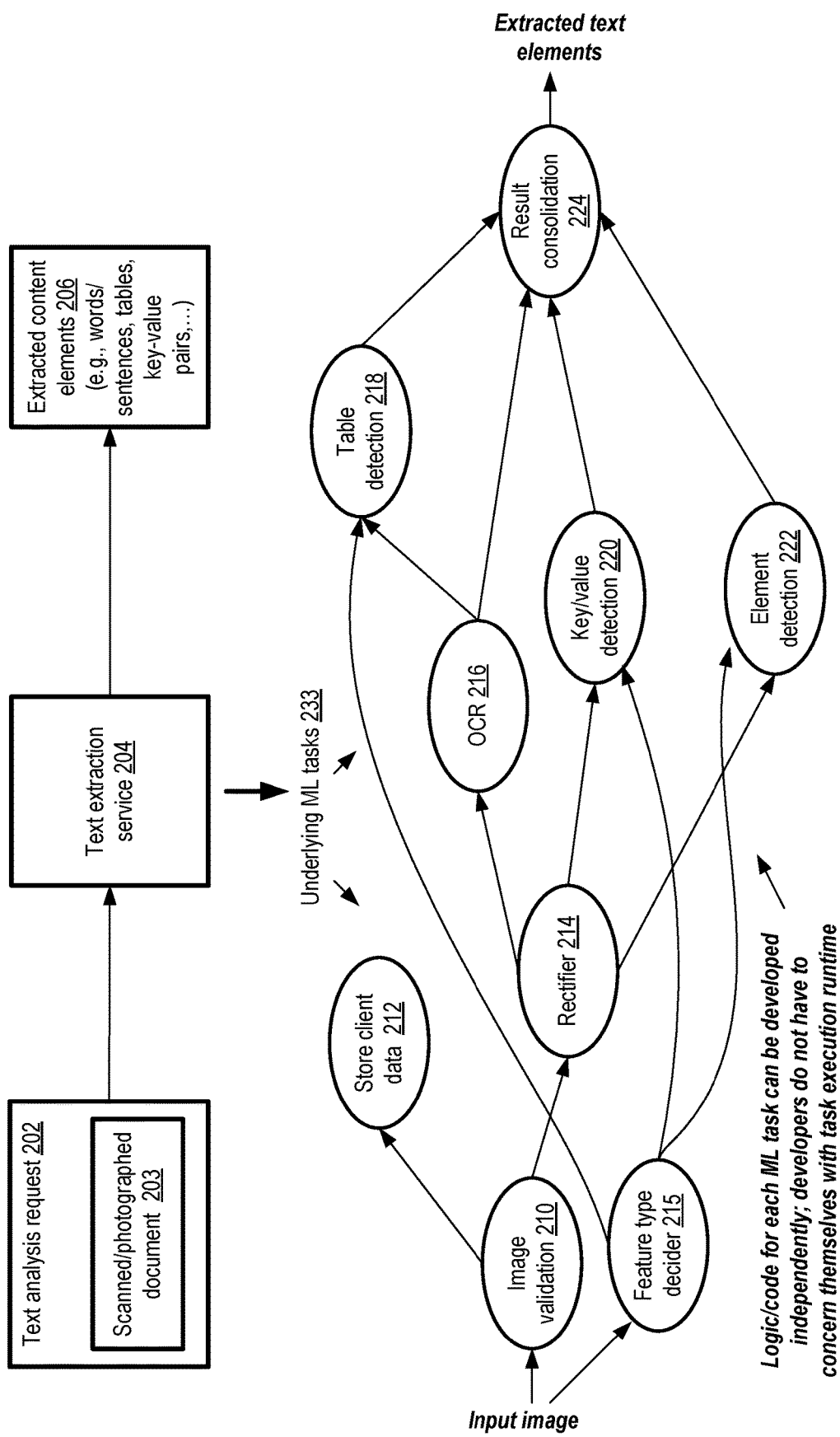
FIG. 2 illustrates an overview of an example analysis request whose response may be obtained using a plurality of lower-level machine learning tasks, according to at least some embodiments.

FIG. 2 illustrates an overview of an example analysis request whose response may be obtained using a plurality of lower-level machine learning tasks, according to at least some embodiments. In the depicted embodiment, a text extraction service 204 may be implemented using an MLTOS similar to MLTOS 102 of FIG. 1. A client of the text extraction service 204 may submit a text analysis request 202, comprising for example a scanned/photographed document 203 from which content elements such as words are to be extracted. The input image of the document may be processed using a set of underlying machine learning (ML) tasks 233 in the depicted embodiment, whose execution enables a set of extracted content elements 206 (such as words, sentences, tables, key-value pairs, etc.) of the document to be provided to the client. Individual ones of the machine learning tasks 233 may include, for example, execution of one or more machine learning models, transformations or computations on vectors/matrices/tensors produced by other tasks, performing I/O operations on output data of other tasks or input received in analysis requests, combining results of other tasks into canonical form for presentation to the client, and so on. An arrow between a given pair of tasks 233 indicates that the output of the task at which the arrow originates (e.g., image validation 210) can be consumed by the task at which the arrow terminates (e.g., rectifier 214); that is, that the output data type(s) of the first of the tasks are compatible with the input data type(s) of the second task of the pair.

The input image may be validated at an image validation task 210 in the embodiment shown in FIG. 2, e.g., to ensure that the image is in an acceptable format and within acceptable input size limits of the text extraction service. The store client data task 212 may save the input provided by the client (e.g., the original image, and/or a modified internal representation of the image obtained from the image validation task) in a persistent repository, e.g., using a storage service of a provider network in some embodiments. A feature type decider task 215 may examine the input image and make an initial inference as to the type of content the document contains, e.g., whether it comprises relatively unstructured text such as a set of sentences, tables containing multiple column values, and the like. The classification of the features may be provided as input to one or more of a table detection task 218, a key/value detection task 220, and a text element detection task 222. A representation of the validated image may be provided as input to a rectifier task 214, in which potentially distorted portions of text (e.g., curved looking text resulting from scanning a non-flat document, such as a page of a thick book) may be transformed using ML techniques into more regular shapes in some embodiments. The rectified or regularized representations of the text may then be provided as input to an optical character recognition (OCR) task 216, the key/value detection task 220 and/or the element detection task in the depicted embodiment. Results of the OCR task 216 may be provided to the table detection task 218 as input. Output from the OCR task 216, the table detection task 218, the key/value detection task 220 and the element detection task 222 may be combined in a result consolidation task 224, whose consolidation output is used to present all the extracted content elements 206 in a standardized format to the client. In various embodiments, the logic or code for the different ML tasks 233 shown in FIG. 2 may be developed independently if an MLTOS is utilized. The developers/designers of the tasks may not have to concern themselves with task execution runtime environment management (e.g., selecting resources to be used, instantiating/launching software containers or virtual machines, etc.), parallelization of tasks, exception handling and I/O configuration (e.g., for inter-task communication and/or for communication with storage services etc.), as these types of operations may be performed by the MLTOS. In at least some embodiments, one or more components of an MLTOS (e.g., an orchestrator) may automatically generate and add code for inter-task communication, communication with storage services, error/exception handling etc. to the code indicated in the ML task descriptors which implements machine learning models, data transformations etc. Note that the set of ML tasks 233 of FIG. 2 represents just one example of the kinds of combinations of tasks which can be coordinated using an MLTOS, for a variety of analysis task categories, and that the orchestration techniques described herein may be applied with equal success to any desired category of analysis request.

Examples of Parallelism Managed by MLTOS

Figure 3:
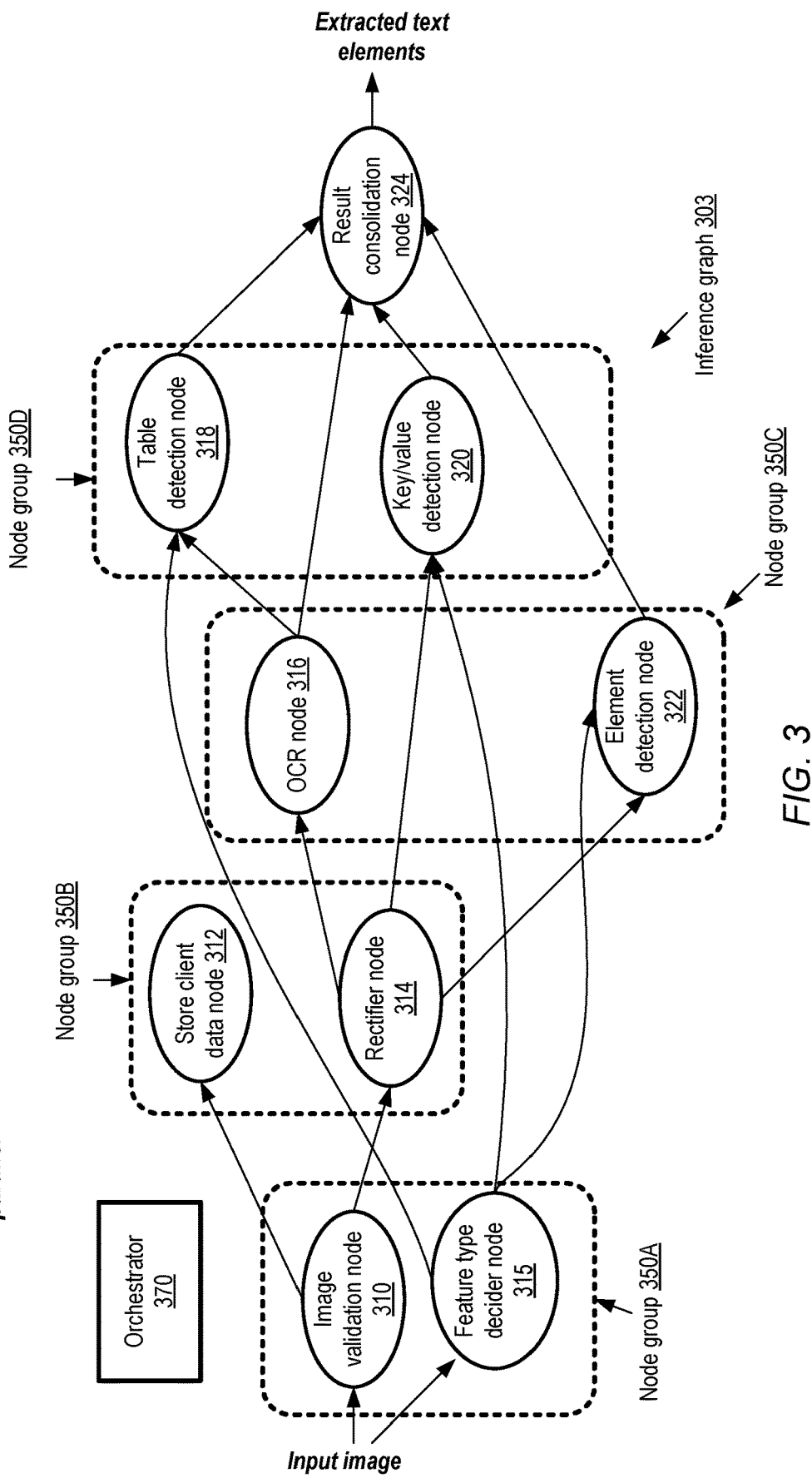
FIG. 3 illustrates a first example type of parallel computations which may be coordinated by an orchestrator of a machine learning task orchestration service, according to at least some embodiments.

In various embodiments, an MLTOS may coordinate the parallel or concurrent execution of at least a subset of tasks of an inference graph. FIG. 3 illustrates a first example type of parallel computations which may be coordinated by an orchestrator of a machine learning task orchestration service, according to at least some embodiments. In the depicted embodiment, an inference graph 303 corresponding to the ML tasks shown in FIG. 2 has been constructed, with respective nodes representing each of the tasks and edges indicating dependencies between the tasks. An orchestrator 370, implemented for example as one or more processes or threads at an orchestrator host of an MLTOS similar to MLTOS 102 of FIG. 1, has been designated to coordinate the execution of the tasks represented by the nodes of graph 303, and to perform tasks in parallel where possible in the depicted embodiment. The orchestrator 370 may be configured to collect outputs produced by various tasks, and feed them as inputs to successor tasks in graph 303.

As inputs for tasks represented by graph nodes become available, in orchestrator-managed parallelism type 1, the orchestrator may identify independently-executable groups of nodes and run each node of such a group (at least partly) in parallel in the depicted embodiment. In at least some embodiment, in order for any group of two or more nodes to be considered independently executable with respect to each other, each of the nodes may have to exhibit "pure function" behavior—that is, the nodes may be required to not have side effects (such as storing state information or other data to persistent I/O storage external to the runtime environments in which the nodes' tasks are executed) which could potentially influence the execution of other nodes. In some embodiments, task validator components of the MLTOS may check whether a given task is side-effect-free (e.g., by monitoring all I/O operations performed during a test execution of the task) and store an indication of whether it exhibits pure function semantics or not.

Orchestrator 370 may be able to identify four groups of nodes of inference graph 303 which can each be run concurrently in the depicted example scenario. Node group 350A comprises image validation node 310 and feature type decider node 315, both of which can begin execution as soon as the input image for the inference graph 303 becomes available. As soon as the output of the image validation node 310 is obtained at the orchestrator 370, execution of node group 350B comprising store client data node 312 and rectifier node 314 may be initiated. Note that even though store client data node 312 may perform I/O operations at persistent storage, the results of such I/O operations may not be used as input by, or otherwise affect the execution of, other nodes of graph 303 such as rectifier node 314, so executing the rectifier node 314 concurrently with the store client data node 312 may be permissible.

When output from the rectifier node 314 becomes available at the orchestrator 370, execution nodes of node group 350C (the OCR node 316 and the element detection node 322) may be initiated at least partly concurrently in the depicted embodiment. When output of the feature type decider node 315 as well as OCR node 316 and rectifier node 314 becomes available, execution of the nodes of node group 350D may be initiated in parallel by the orchestrator. Note that not all the nodes of a given node group may be dependent on the same set of results of predecessor nodes being available—e.g., in node group 350D, table detection node 318 depends on predecessor nodes 315 and 316, while key/value detection node 320 depends on results from predecessor nodes 314 and 315. Result consolidation node 324 may not be considered part of a parallelizable node group comprising any other node in the depicted embodiment. In various embodiments, the execution of the different nodes within a node group identified for parallel execution may not necessarily be initiated and completed at exactly the same time. For example, if a node group comprises nodes N1 and N2, initiation of N1 execution may begin before N2 completes, and initiation of N2 execution may be initiated before N1 completes, so that at least some operations of N1 and N2 overlap in time, but the start or end times of N1 need not be exactly the same as the start or end times of N2.

Figure 4:
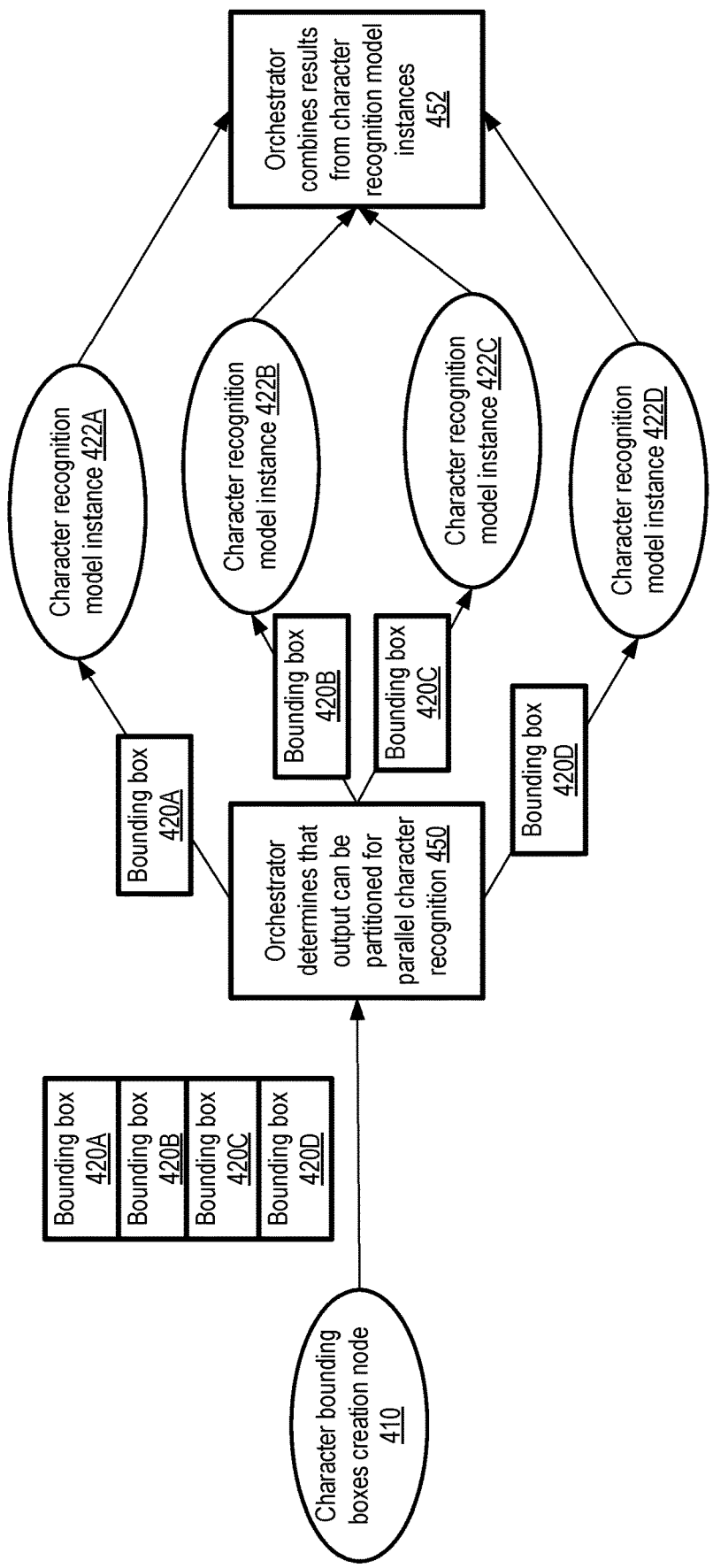
FIG. 4 illustrates a second example type of parallel computations which may be coordinated by an orchestrator of a machine learning task orchestration service, according to at least some embodiments.

FIG. 4 illustrates a second example type of parallel computations which may be coordinated by an orchestrator of a machine learning task orchestration service, according to at least some embodiments. The type of parallelism shown in FIG. 3 may be referred to as inter-task parallelism, and the type of parallelism shown in FIG. 4 may be referred to as input partitioning based parallelism. In orchestrator-managed parallelism type 2, an orchestrator may identify one or more nodes whose output comprises multiple records or data elements at a time, such that the records or elements can be grouped into partitions that can be processed independently of one another. Having identified such nodes and received partitionable output from such a node, the orchestrator may subdivide the output into partitions and transmit respective partitions to multiple instances or copies of successor nodes where each partition can be analyzed/processed independently.

In the example scenario shown in FIG. 4, one of the nodes of an inference graph may identify multiple bounding boxes within an image of a document, each of which is a candidate for character recognition. A given bounding box may comprise coordinates of a rectangle within an image, for example. Output of character bounding boxes creation node 410 may comprise a plurality of bounding boxes 420 (such as 420A, 420B, 420C and 420D). An orchestrator of an MLTOS similar to MLTOS 102 of FIG. 1 may determine, as shown in element 450, that the output of character bounding boxes creation node 410 van be partitioned for parallel character recognition, and transmit each of the bounding boxes to a distinct instance of a character recognition model in the depicted embodiment. Thus, for example, bounding box 420A may be provided as input to character recognition model instance 422A, bounding box 420B may be provided as input to character recognition model instance 422B, bounding box 420C may be provided as input to character recognition model instance 422C, bounding box 420D may be provided as input to character recognition model instance 422D, and so on. Results of each of the instances may be combined at the orchestrator as shown in element 452. Each of the character recognition model instances 422 may represent independently executing and functionally equivalent copies of an ML task of an inference graph whose execution is being coordinated by the orchestrator in the depicted embodiment. In at least some embodiments, a client may specify the specific types of orchestrator-managed parallelism the MLTOS should perform on behalf of the client—e.g., whether the kind of parallelism shown in FIG. 3 should be implemented where possible, whether the kind of parallelism shown in FIG. 4 should be implemented where possible, or whether both or neither kind of parallelism should be orchestrated. In the absence of explicit guidance from a client regarding the kinds of parallelism to be attempted, in some embodiments an MLTOS may attempt to implement both types of parallelism in an effort to speed up the execution of the corresponding graphs as much as possible.

Example Data-Driven Selection of Task Versions

Figure 5:
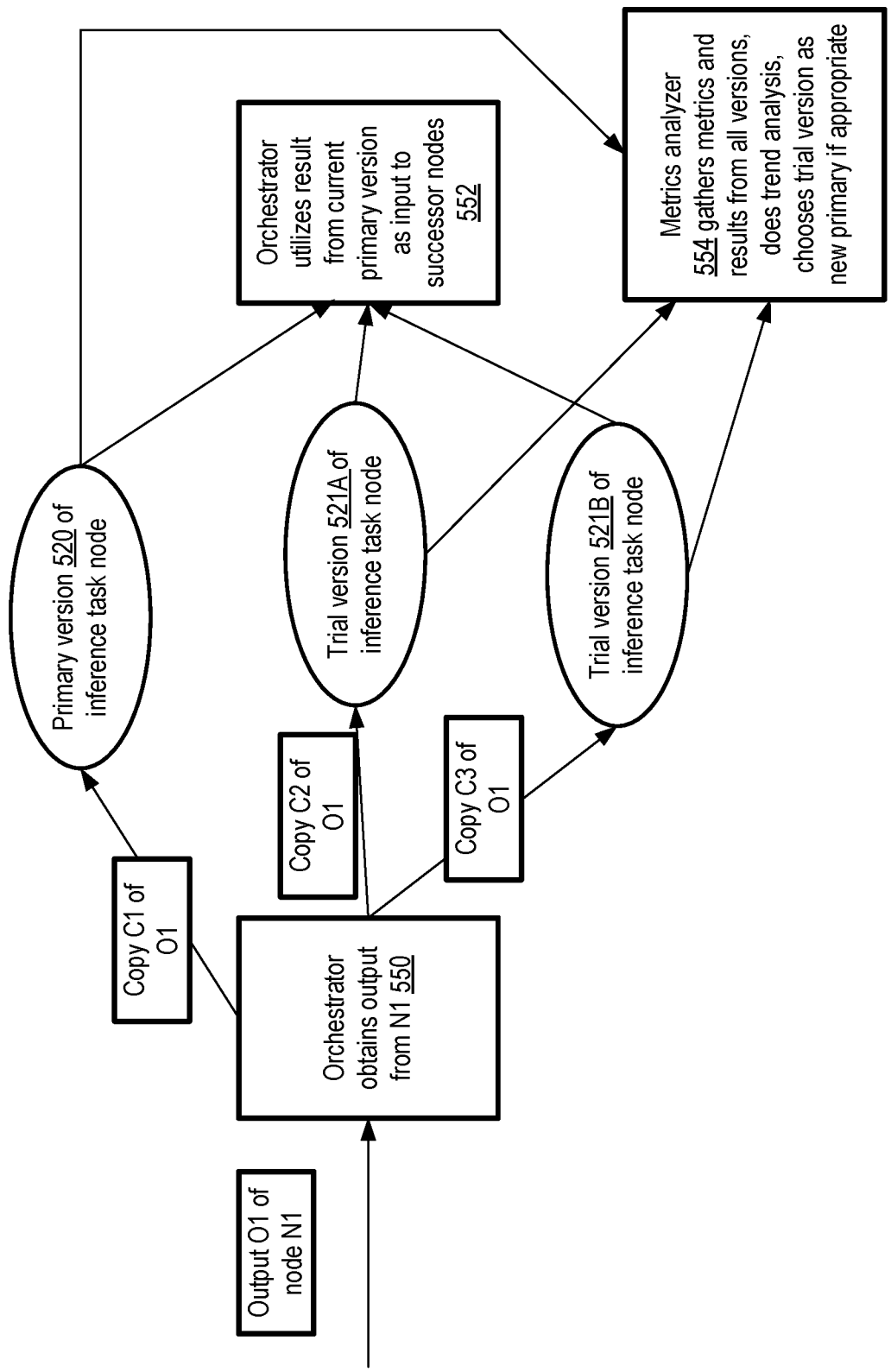
FIG. 5 illustrates an example scenario in which interactions with a primary version and one or more trial versions of an inference task node may be initiated by an orchestrator, according to at least some embodiments.

In some embodiments, experiments using several different implementations of a given ML task may be conducted with the help of an orchestrator at the request of a client of an MLTOS similar to MLTOS 102 of FIG. 1, e.g. to identify which (if any) of the implementations provides results of higher quality than the rest. FIG. 5 illustrates an example scenario in which interactions with a primary version and one or more trial versions of an inference task node may be initiated by an orchestrator, according to at least some embodiments. In the depicted example scenario, a particular implementation of an inference task may currently be designated as the primary version of the inference task, and experiments may be conducted using at least two trial versions of the same inference task. The versions may be functionally equivalent (in that they may provide the same kind of output for a given input as all the other versions) but may differ, for example, in hyperparameter values for a machine learning model being run as part of the task, such as the number or dimensionality of neural network layers of various kinds (convolutional layers, pooling layers, fully-connected layers etc.), the specific type of ML model being used (e.g., random forest model versus neural network based model), and so on.

An orchestrator of an MLTOS may obtain an output O1 of a node N1 of an inference graph, as shown in element 550 of FIG. 5. The orchestrator may transmit a first copy C1 of O1 to the primary version 520 of an inference task node, a second copy C2 of O1 to a first trial version 521A of the inference task node, and a third copy C3 of O1 to a second trial version 521B of the inference task node. In one embodiment, the results from all the versions may be obtained at the orchestrator, as indicated in element 552, but the result from the current primary version may be used as input for successor nodes. In some embodiments, results generated at each of the versions, as well as performance metrics collected from each of the versions, may be examined by a metrics analyzer 554 of the MLTOS. The metrics analyzer may compare the quality and performance of the different versions over time (e.g., for several different inputs, corresponding to different analysis requests from end users). The metrics analyzer may choose one of the trial versions as a new primary version based on analysis of trends in the inference quality or performance metrics trends in some embodiments. In at least one embodiment, the metrics and inference quality trends may be analyzed by an orchestrator rather than by a separate metrics analyzer, and a new primary version may be selected by the orchestrator in such an embodiment.

Example Categories of Inference Graph Nodes and Runtime Environments

Figure 6:
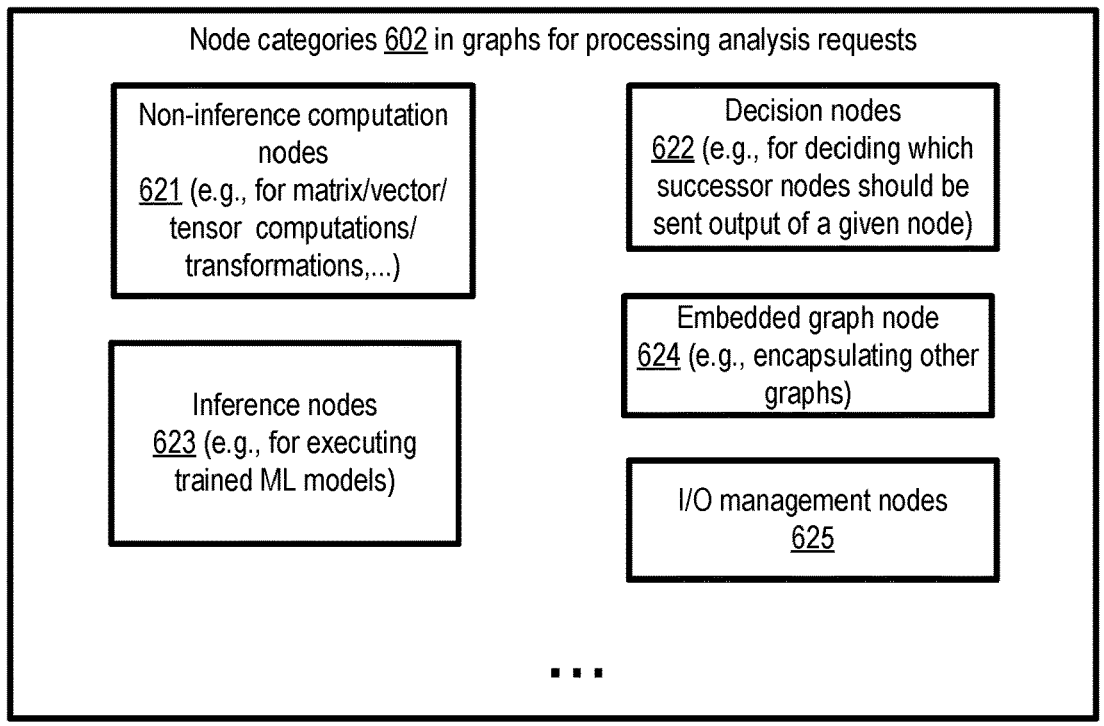
FIG. 6 illustrates example categories of nodes which may be included in graphs for processing analysis requests, and example runtime environment categories at which computations of the nodes may be performed, according to at least some embodiments.
Figure 6:
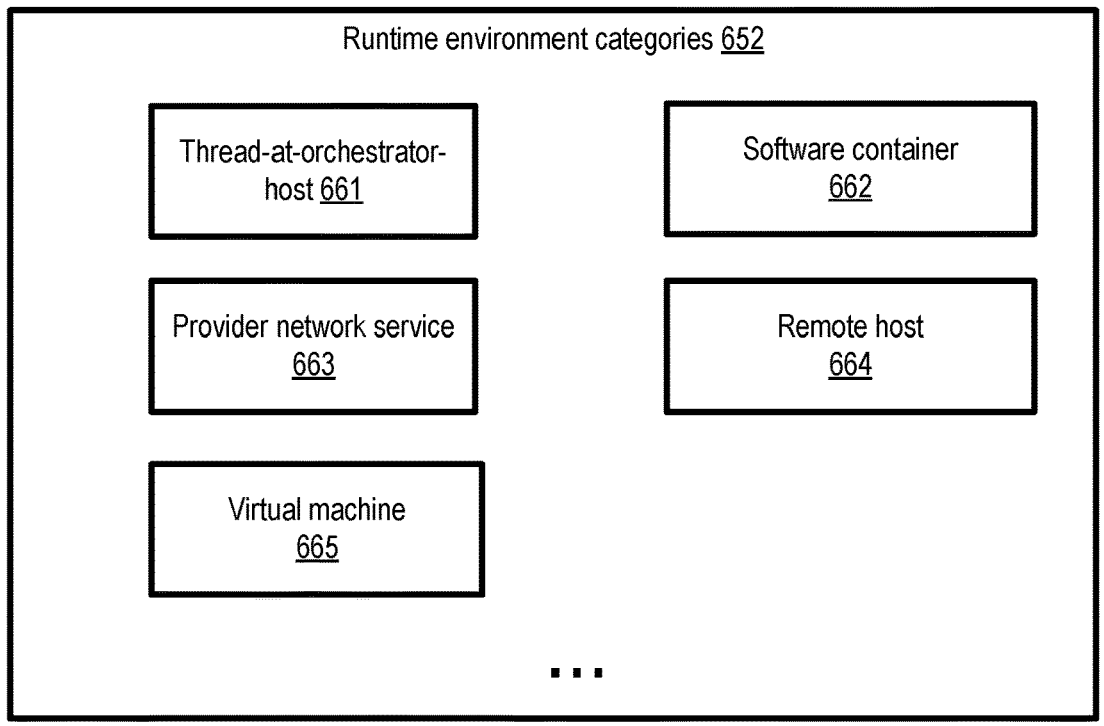

FIG. 6 illustrates example categories of nodes which may be included in graphs for processing analysis requests, and example runtime environment categories at which computations of the nodes may be performed, according to at least some embodiments. Node categories 602 may include, among others, non-inference computation nodes 621, inference nodes 623, decision nodes 622, embedded graph nodes 624, and I/O management nodes 625 in the depicted embodiment. Inference nodes 623 may each execute one or more trained machine learning models for one or more input records in various embodiments. Non-inference computation nodes 621 may be utilized, for example, for calculations or transformations on matrices, vectors, tensors, but may not comprise entire machine learning models as such.

Decision nodes 622 may conditionally select a subset of successor nodes to which output of a given node should be transmitted. For example, in a text extraction scenario, a client may include a parameter indicating that the client is not interested in extracting table contents from a given document specified in an analysis request, and a decision node may prevent output from a predecessor node from reaching a table detection node of the inference graph being used. In another example of a decision node, a multi-lingual inference graph for text extraction may include respective nodes for optical character recognition with respect to English, Russian, Mandarin, and so on, and a decision node may ensure that only the particular OCR node relevant to a particular document is executed (e.g., based on output of a language detection node which is a predecessor to the OCR nodes).

In some embodiments, a single node in an inference graph may serve as a proxy for an entire other inference graph. For example, one graph G1 may include a set of nodes for detecting text within a document, and another graph G2 for analyzing a document may utilize a single node representing G1 as one of G2's constituent nodes (e.g., in addition to other G2 nodes for identifying tables, key-value pairs and so on). Such a proxy node may be referred to an embedded graph node 624 in some embodiments. Some inference graphs may include nodes dedicated to I/O management. An I/O management node 625 may be responsible for storing client-provided inputs and/or intermediate or final results of an inference graph at one or more external storage services or repositories, or for extracting data that is to be processed at other nodes of a graph from one or more data sources in some embodiments. Other categories of nodes may be utilized in some embodiments at an MLTOS than those shown in FIG. 6.

As mentioned earlier, a variety of runtime environments may be used to execute ML tasks of inference graphs in different embodiments. In at least one embodiment, an inference flow designer or developer may indicate one or more acceptable runtime environment categories in an ML task descriptor, and in some cases may provide different software packages or programs that can be run in each of the runtime environment categories. In some embodiments, an orchestrator may be permitted to choose the particular category of runtime environment (from among the acceptable categories) for a given task's execution, and/or the specific resources at which the runtime environment is to be instantiated. Supported runtime environment categories 652 may include, among others, a thread or process at the host being used for the orchestrator (referred to as Thread-at-orchestrator-host 661), a software container 662, a resource of a provider network service 663, a remote host 664, or a virtual machine 665 (such as a compute instance of a virtualized computing service, a Java™ virtual machine, and so on). In some embodiments, an orchestrator may choose a particular resource or runtime environment from a pool of pre-configured available resources or runtime environments for executing a given node of an inference graph. In at least some embodiments, different types of runtime environments may be employed for different nodes of a given graph.

Example Orchestration of Text Document Analysis

Figure 7:
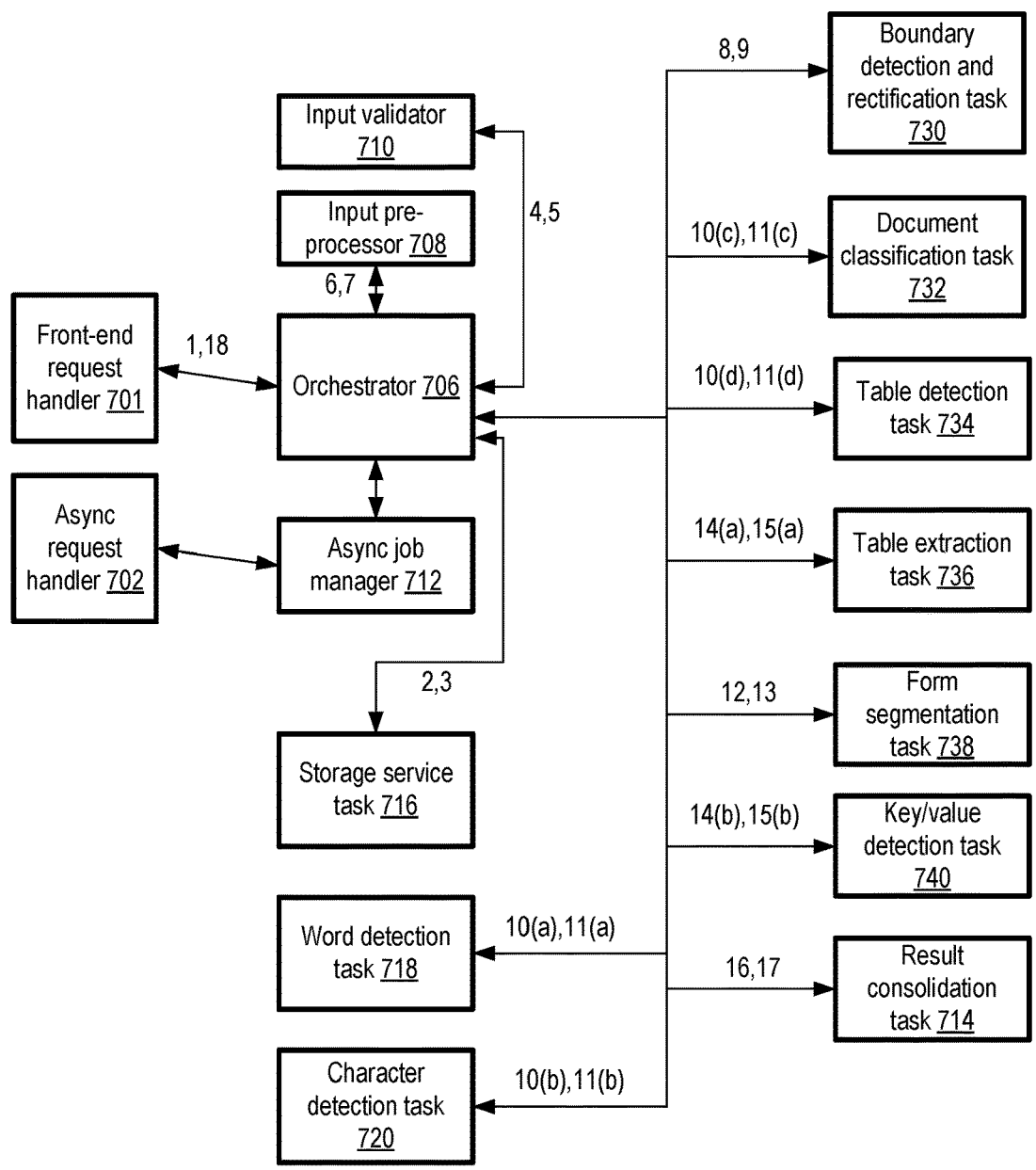
FIG. 7 illustrates an example sequence of interactions between an orchestrator and a plurality of machine learning task nodes used for text analysis, according to at least some embodiments.

FIG. 7 illustrates an example sequence of interactions between an orchestrator and a plurality of machine learning task nodes used for text analysis, according to at least some embodiments. Bidirectional interactions between various components of the system are numbered using a pair of integers in FIG. 7, with the first integer indicating the ordinal sequence in which the first interaction of the bidirectional interaction occurs relative to other depicted interactions, and the second integer indicating the ordinal sequence in which the second interaction (in the reverse direction) occurs. Thus, the label 1,18 for interactions between the front-end request handler 701 and the orchestrator 706 indicates that the first interaction depicted in the figure comprises a communication from the front-end request handler to the orchestrator, and a communication back to the front-end request handler is the $18^{th}$ interaction. When several interactions can occur concurrently, a bracketed letter notation is added to the integer—e.g., interactions 10(*a*), 10(*b*), 10(*c*) and 10(*d*) may occur in parallel.

In the depicted embodiment, an orchestrator 706 comprising one or more threads of execution at a host of an MLTOS similar in functionality to MLTOS 102 of FIG. 1 may receive a request to analyze an image or scan of a document from a front-end request handler 701, as indicated by the label 1 of the integer pair 1,18. The orchestrator may initiate a storage service task 716 (e.g., to store a representation of the input image in persistent storage), and receive an acknowledgement that the storage service task was successful, as indicated by the integer pair 2,3. A task to validate the input image (e.g., by verifying the image file format, the size of the image, etc.) may be initiated and completed at an input validator 710, as indicated by integer pair 4,5 in the depicted embodiment. An input pre-processor task 708 may then be used to perform some preliminary transformations of the image, such as decoding the image, resizing the image if needed and removing the alpha channel from the image; the pre-processing initiation and completion communications are indicated by the label 6,7. The orchestrator 706 may receive the pre-processed version of the image as part of the interaction labeled 7.

After the pre-processing is completed, a boundary detection and rectification task 730 for the pre-processed input may be initiated and completed in the depicted embodiment, as indicated by the labels 8,9. Then, four tasks which each consume respective copies of the results of the boundary detection and rectification task may be initiated for (at least partly) parallel execution by the orchestrator 706: a word detection task 718 (interaction 10(*a*)), a character detection task 720 (interaction 10(*b*)), a document classification task 732 (interaction 10(*c*)), and a table detection task 734 (interaction 10(*d*)). The results of the four tasks, at least some of which may involve the execution of one or more respective machine learning models such as neural network based models, may be provided to the orchestrator in interactions 11(*a*), 11(*b*), 11(*c*) and 11(*d*). The orchestrator 706 may then initiate a form segmentation task 738 to subdivide one or more forms in the document into bounding boxes expected to comprise respective sets of text elements, and receive results indicating the segments (each comprising a respective bounding box) into which the form(s) have been divided, as indicated by the arrow labeled 12,13. A table extraction task 736 (interaction 14(*a*)) and a key/value detection task 740 (interaction 14(*b*)) may then be initiated in parallel by the orchestrator 706, and the corresponding results may be obtained at the orchestrator (interactions 15(*a*) and 15(*b*)). The results collected by the orchestrator may be sent to a result consolidation task 714 (interaction 16) and the consolidated results obtained at the orchestrator in interaction 17 may be provided via the front-end request handler (interaction 18) to the client from whom the request to analyze the document was received in the depicted embodiment.

The set of example numbered interactions depicted in FIG. 7 correspond to a synchronous processing of a client request. For some types of analyses, such as analysis of a multi-page document, which may be expected to take longer on average than analysis of a single page document, an synchronous request (e.g., using a different client-submitted request) may be submitted by a client in various embodiments to an MLTOS or an analytics service implemented using the MLTOS. In such a scenario, an asynchronous request handler 702 may receive the request and transmit an internal representation of the request to an asynchronous job manager 712. The asynchronous job manage may then in effect subdivide the document into smaller units (e.g., individual pages) and use an orchestrator 706 for coordinating the analysis of the smaller units. Each smaller unit may be processed using a set of interactions similar to the numbered interactions of FIG. 7. In some cases, the different units of the asynchronous job may be processed in parallel—e.g., a respective orchestrator may coordinate analysis of each unit. The results of processing/analyzing all the units may be combined at the asynchronous job manager 712 and provided to the client via the asynchronous request handler 702 in some embodiments.

Example Programmatic Interactions with Inference Flow Designers

Figure 8:
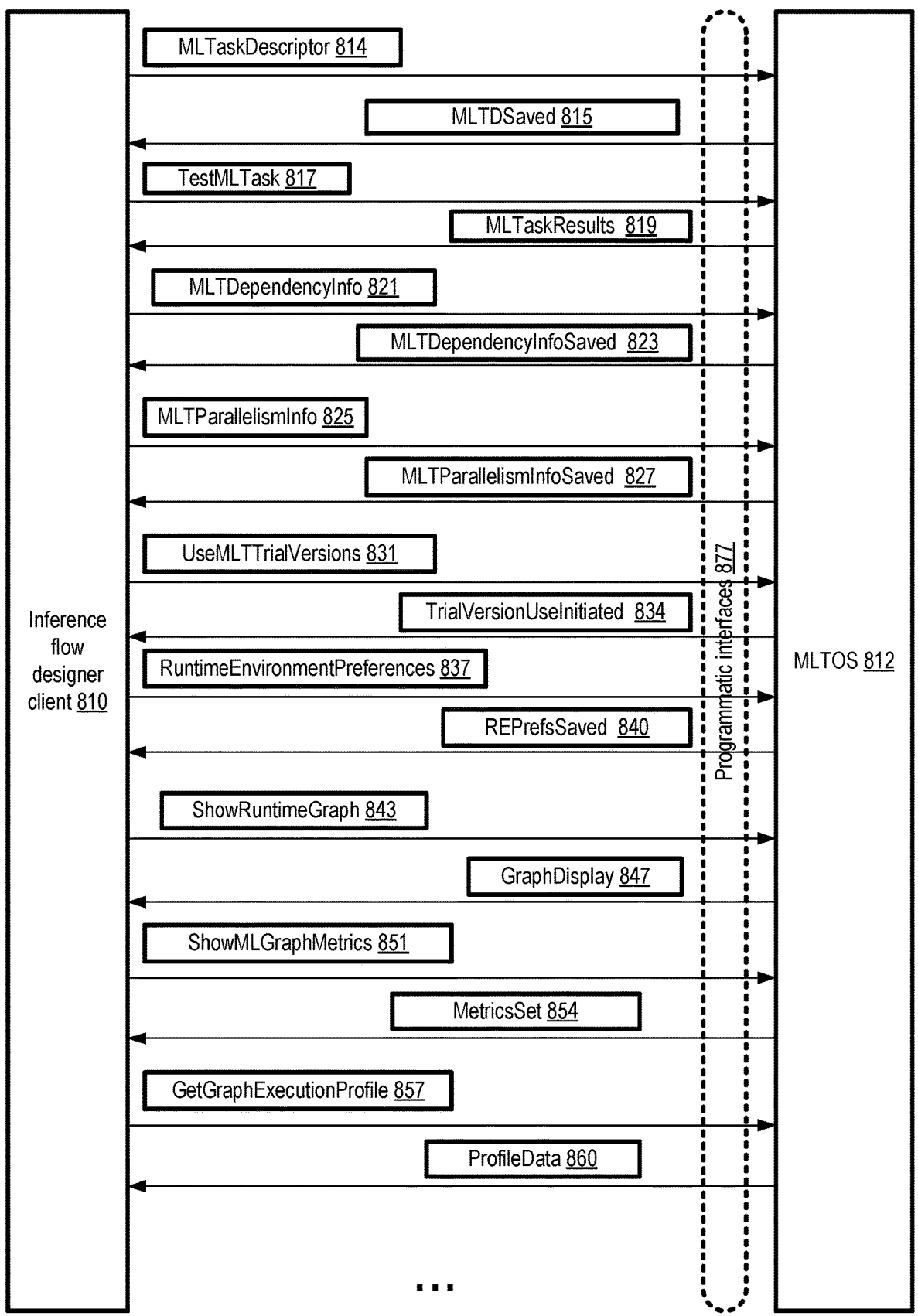
FIG. 8 illustrates example programmatic interactions between an inference flow designer client and a machine learning task orchestration service, according to at least some embodiments.

FIG. 8 illustrates example programmatic interactions between an inference flow designer client and a machine learning task orchestration service, according to at least some embodiments. In the embodiment depicted in FIG. 8, an MLTOS 812, similar in features and functionality to MLTOS 102 of FIG. 1, may implement a set of programmatic interfaces 877 which can be used by data scientists and other inference flow designer clients to submit various types of requests and messages pertaining to the design of inference graphs, and receive corresponding responses. Programmatic interfaces 877 may, for example, include one or more web-based consoles, graphical user interfaces, command-line tools, application programming interfaces (APIs) and the like in different embodiments.

Using programmatic interfaces 877 a client 810 may submit respective descriptors of one or more machine learning tasks (e.g., tasks of the kind illustrated in FIG. 6) to the MLTOS in MLTaskDescriptor messages 814 in some embodiments. A given task descriptor may, for example, include source code and/or executable code for a task, an indication of metrics to be collected during execution of the task, acceptable categories of runtime environments at which the task can be run (such as the categories shown in FIG. 6), retry criteria for the task, and so on. In some embodiments, different versions of the source code or executable code of a given task may be provided for respective runtime environments. The descriptors may be stored at a repository of the MLTOS and one or more MLTDSaved messages 815 may be sent back to the client via the programmatic interfaces 877.

A client may request that a given machine learning task's functionality be tested at the MLTOS, e.g., by submitting a TestMLTask request 817 in some embodiments. The test request may indicate input to be provided to the task, the type of runtime environment(s) to be used, success criteria for the tests, and/or various other types of metadata. The task may be tested at one or more runtime environments, and results may be provided to the client 810 in one or more MLTaskResults messages 819.

Information about the dependencies among different ML tasks to be used together to solve a particular analysis problem (such as extracting text from an image of a document, recognizing objects within an image or video, etc.) may be provided in one or more MLTaskDependencyInfo messages 821 in the depicted embodiment. In some embodiments, the client may use a domain-specific language or annotation technique supported by the MLTOS to define edges of an inference graph of the kind discussed earlier, where nodes of the graph represent ML tasks and individual edges represent respective dependencies. The dependency information may be stored at a repository and an MLTDependencyInfoSaved message 823 may be sent to the client in some embodiments.

According to some embodiments, a client 810 may submit preferences regarding the types of parallelism which the MLTOS orchestrators should attempt to identify and coordinate with respect to one or more graphs in an MLTParallelismInfo message 825. For example, the client could specify which (if any) of the kinds of parallelism discussed in the context of FIG. 3 and FIG. 4 are to be utilized for processing one or more types of analysis tasks. The parallelism preferences may be stored at the MLTOS and utilized later during run time by orchestrators; an MLTParallelismInfoSaved message 827 may be sent to the client in the depicted embodiment.

In some embodiments, a client may submit a UseMLTTrialVersions request 831 to enable data-driven selection of ML task implementations, e.g., using techniques similar to those described in the context of FIG. 5. The client 810 may, for example, indicate a current primary version of a task implementation as well as one or more trial versions on which experiments are to be conducted, as well as criteria to be used to select a new primary in some embodiments. The MLTOS may store metadata indicating that the trial version experiments are to be conducted, and send a Trial VersionUseInitiated message 834 to the client in some embodiments.

A client may use RuntimeEnvironmentPreferences messages 837 to provide guidance regarding the criteria to be used to select runtime environments for ML tasks run for various types of end user requests in some embodiments. For example, the client may indicate that under a set of specified operating conditions (e.g., as long as the CPU utilization at the orchestrator host being used remains within a specified range), a thread or process on the same host as the orchestrator should preferably be used to run a specified ML task, but that processes on remote hosts of a specified pool should be used if the operating conditions change. The runtime environment preferences may be saved and an REPrefsSaved message 840 may be sent to the client in the depicted embodiment.

A ShowRuntimeGraph request 843 may be sent by a client to request the display of a graph (including, for example, information about the runtime environments and resources used, the performance metrics and/or retry statistics collected, etc.) showing the interactions between different ML tasks during processing of one or more analysis requests in the depicted embodiment. A graph indicating the ML tasks, their interactions, respective runtime environments and/or metrics may be displayed using data transmitted via one or more GraphDisplay messages 847 in the depicted embodiment.

If a client wishes to view just the set of metrics collected during the execution of one or more inference graphs, a ShowMLGraphMetrics request 851 may be sent in at least some embodiments to the MLTOS. In response, the collected metrics (e.g., latencies, resource utilization levels at various runtime environments used, number of bytes transferred, confidence levels associated with inference results, and so on) may be presented via one or more MetricsSet messages 854 in the depicted embodiment. The client may specify the granularity at which the metrics are to be presented in some embodiments—e.g., whether metrics aggregated over a specified time period are to be presented, whether metrics are to be broken out on a per-task basis or aggregated at the graph level, and so on.

As mentioned earlier, in at least some embodiments, clients may be provided tools for profiling and benchmarking ML tasks and inference graphs in some embodiments. A client 810 may, for example, submit a GetGraphExecutionProfile request 857 to obtain a profile showing how much time is spent in which specific ML tasks and in which portions of the code of various tasks, so that performance bottlenecks can be identified more easily. The requested profile data may be sent to the client in a ProfileData message 860 in some embodiments. In at least some embodiments, programmatic interactions other than those shown in FIG. 8 may be supported by an MLTOS.

Example Provider Network Environment

Figure 9:
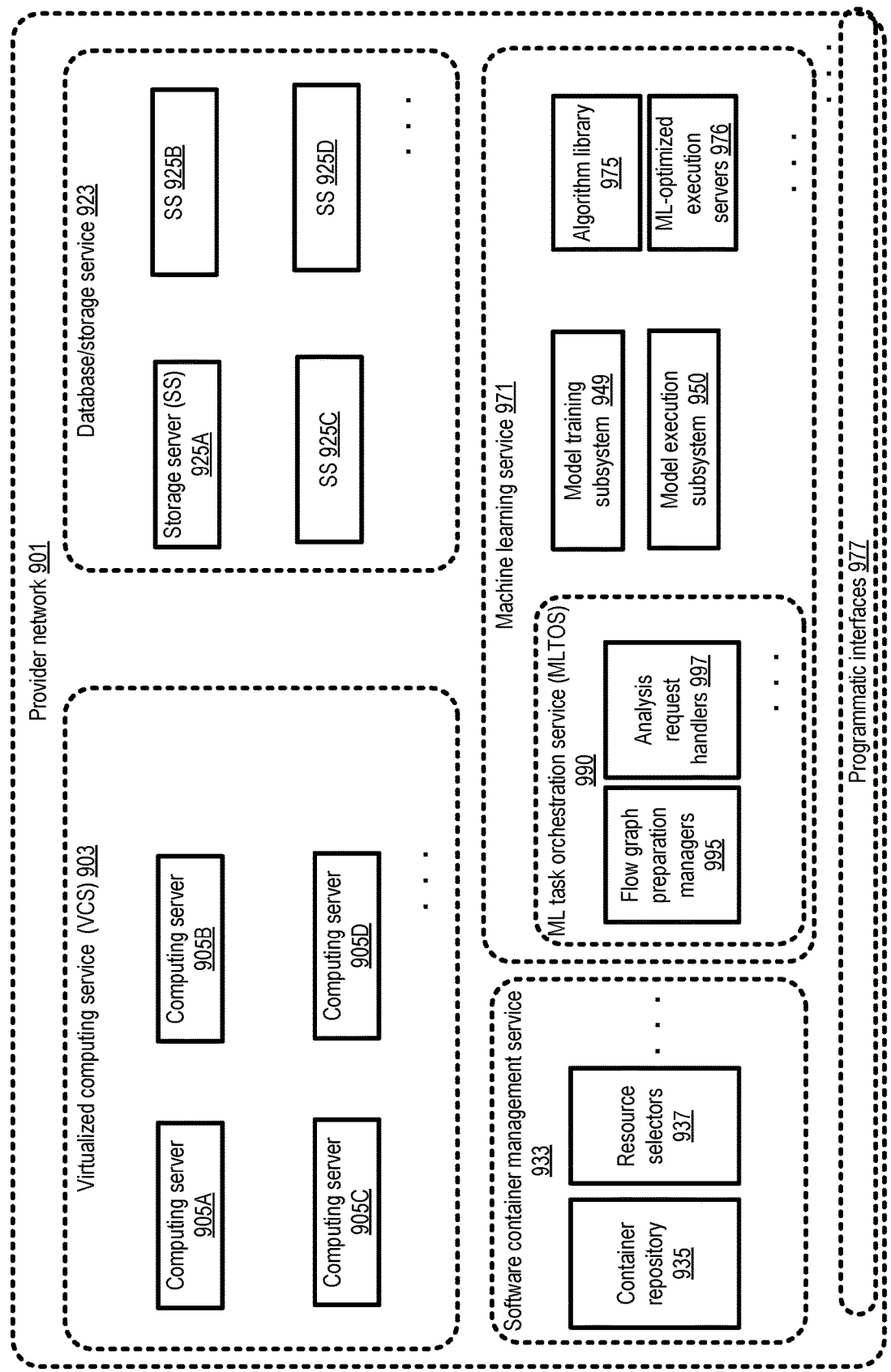
FIG. 9 illustrates an example provider network environment in which a machine learning task orchestration service may be implemented, according to at least some embodiments.

FIG. 9 illustrates an example provider network environment in which a machine learning task orchestration service may be implemented, according to at least some embodiments. In the depicted embodiment, provider network 901 may comprise resources used to implement a plurality of services, including for example a virtualized computing service (VCS) 903, a database/storage service 923, a software container management service 933 as well as a machine learning service 971 within which an ML task orchestration service 990 similar to MLTOS 102 of FIG. 1 may be implemented.

The machine learning service 971, which may also be referred to as an analytics service or an artificial intelligence service, may comprise algorithm library 975, model training subsystem 949 at which various types of models (including the kinds of models used for tasks of inference flows) may be trained and re-trained using algorithms from library 975, model execution subsystem 950 at which the models are executed, as well as a set of machine learning-optimized execution servers 976 (e.g., servers comprising chipsets developed specifically for ML tasks) in the depicted embodiment. The ML task orchestration service 990 may include flow graph preparation managers 997 (similar in functionality to graph preparation managers 140 of FIG. 1) as well as analysis request handlers 995 (implementing functionality similar to analysis request handlers 142 of FIG. 1) in the depicted embodiment. Software container management service 933 may comprise a container repository 935 and resource selectors 937 which dynamically acquire computing resources (e.g., from VCS 903) to execute software containers which may be used as runtime environments for inference graph nodes/tasks as discussed earlier.

Components of a given service may utilize components of other services in the depicted embodiment—e.g., for some machine learning service tasks, virtual machines implemented at computing servers such as 905A-905D of the virtualized computing service 903 may be used, example input data, metrics and/or output produced at the machine learning service may be stored at storage servers 925 (e.g., 925A-925D) of storage service 923, and so on. Individual ones of the services shown in FIG. 9 may implement a respective set of programmatic interfaces 977 which can be used by external and/or internal clients (where the internal clients may comprise components of other services) in the depicted embodiment.

Methods for Inference Flow Orchestration

Figure 10:
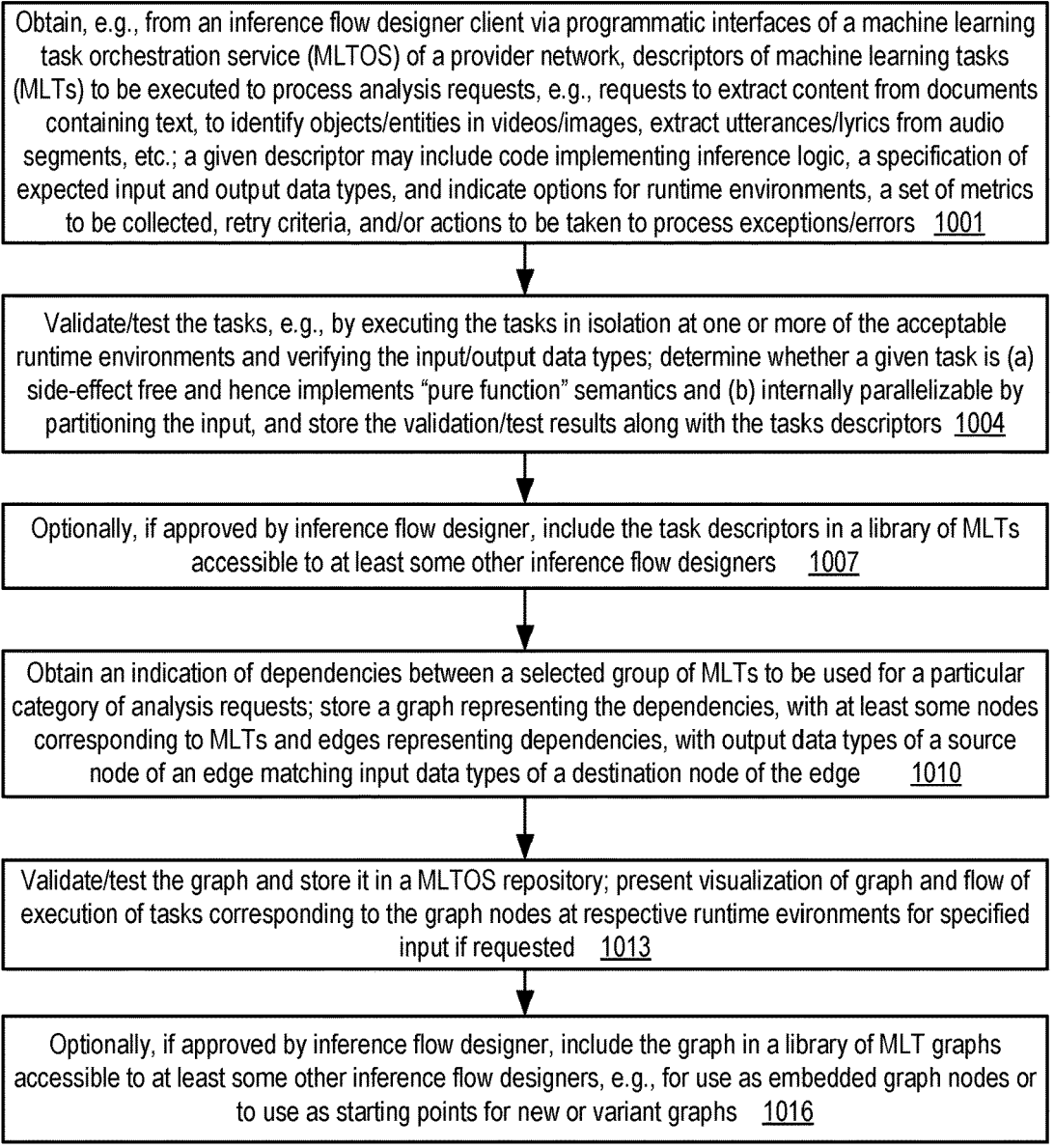
FIG. 10 is a flow diagram illustrating aspects of operations that may be performed at a machine learning task orchestration service to prepare graphs of machine learning task nodes for processing analysis requests, according to at least some embodiments.

FIG. 10 is a flow diagram illustrating aspects of operations that may be performed at a machine learning task orchestration service to prepare graphs of machine learning task nodes for processing analysis requests, according to at least some embodiments. As shown in element 1001, respective descriptors of various machine learning tasks to be conducted to process analysis requests of one or more categories may be obtained, e.g., via programmatic interfaces of a server-less machine learning orchestration service (MLTOS) similar to MLTOS 102 of FIG. 1. The descriptor for a given machine learning task may, for example, include program code implementing inference logic or other computations, specifications (e.g., data types) of the expected input and output of the task, options for acceptable runtime environments, metrics to be collected, retry criteria (such as a timeout after which a task may have to be re-attempted, e.g., using a different runtime environment, or a set of result quality checks which may lead to re-execution of a task), actions to be taken to process exceptions/errors and the like in different embodiments. The analysis requests for which the tasks are to be executed may include, for example, requests to extract contents including text of scanned or photographed documents, requests to identify objects or entities within images or videos, requests to extract spoken words or utterances from audio segments, and so on. In at least some embodiments, domain experts such as inference flow designers responsible for solving a variety of machine learning based problems may submit the task descriptors via the programmatic interfaces of the MLTOS, e.g., to enable sharing of algorithms and models within and/or across organizations.

According to some embodiments, the tasks whose descriptors are provided may be validated and/or tested at the MLTOS (element 1004), e.g., by running the tasks in isolation at one or more of the acceptable runtime environments and verifying the input and output data types or signatures of the tasks. In one embodiment, as part of such verification/testing, the MLTOS may determine whether a given task is side-effect free and hence implements "pure function" semantics, and/or whether a given task is internally parallelizable by partitioning its input and distributing the partitions among several instances or copies of the task. The results of the validation and other tests may be stored along with the descriptors themselves, e.g., in a repository of the MLTOS in various embodiments. The results with respect to pure function semantics and/or internal parallelizability may be used later to perform several tasks in parallel for a given analysis request and/or to speed up the processing of given task by partitioning its input and using multiple instances of the task in some embodiments.

Optionally, if approved by the client who submitted the descriptors, the task descriptors may be included in a library of machine learning tasks of the MLTOS (element 1007) in the depicted embodiment. Such a library may be made accessible to other clients of the MLTOS, who may for example wish to reuse tasks for other analysis request categories, or create modified/enhanced implementations of the tasks. The set of other clients with whom the task descriptors are to be shared may be indicated by the authors/submitters of the descriptors in various embodiments.

An indication of the dependencies between individual machine learning tasks to be used for a particular category of analysis task may be obtained in various embodiments (element 1010). A client may indicate such dependencies using a language for graph specification supported by the MLTOS in some embodiments. A graph representing the dependencies may be stored, with nodes of the graph corresponding to MLTs and directed edges representing dependencies. If an edge is directed from one node N1 to another node N2, the output data type(s) of M1 may match the input data type(s) of N2. In some embodiments, the MLTOS may constrict a graph from the dependency information supplied by a client such as an inference flow designer, and request the client to verify that the constructed graph is correct.

In at least some embodiments, the graph may be validated and tested before it is stored in an MLTOS repository (element 1013). Visualizations of the graph and the flow of execution amongst its nodes/tasks, indicating respective runtime environments used for each of the nodes, may be presented when (or after) the graph nodes are executed in response to analysis requests in various embodiments.

If approved by the client, the graph may be included in a library of graphs maintained at the MLTOS in some embodiments (element 1016). The graphs of the library may be made available to other inference flow designers, e.g., for use as embedded or proxy nodes within other graphs or to use as starting points for developing new or variant graphs.

Figure 11:
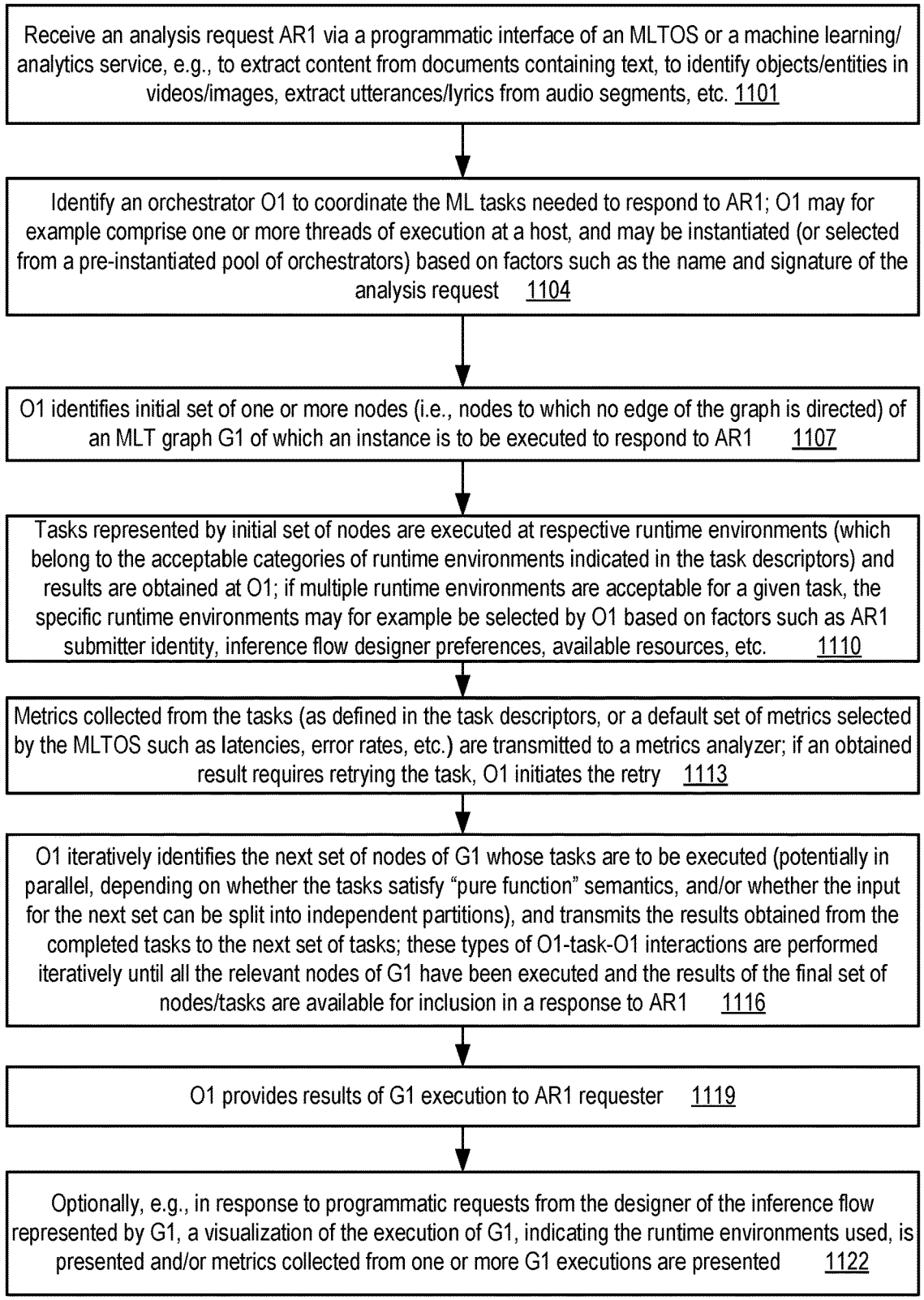
FIG. 11 is a flow diagram illustrating aspects of operations that may be performed to process an analysis request using an orchestrator and a graph of machine learning task nodes, according to at least some embodiments.

FIG. 11 is a flow diagram illustrating aspects of operations that may be performed to process an analysis request using an orchestrator and a graph of machine learning task nodes, according to at least some embodiments. As shown in element 1101, an analysis request AR1 for which a graph of ML tasks has been stored may be obtained via programmatic interfaces of an MLTOS or a more general machine learning or analytics service. The analysis request may require extraction of content from images/scans of documents containing text, identification or recognition of objects or entities within images or videos, extraction of utterances or lyrics from audio segments, etc.

An orchestrator O1 may be identified or instantiated to coordinate the execution of the ML tasks needed to respond to AR1 (element 1104) in various embodiments. O1 may for example comprise one or more threads of execution at a host of the MLTOS, and may be instantiated (or selected from a pre-existing pre-configured pool of orchestrators) based on various factors such as the name and signature of the analysis request, the identity of the requester from whom the analysis request was received, etc.

O1 may identify the initial set of one or more nodes of an MLT graph G1 (from among a collection of graphs maintained at the MLTOS) of which an instance is to be executed to respond to AR1 in the depicted embodiment (element 1107). Such an initial set may comprise nodes to which no edge of G1 is directed, for example. The tasks represented by the initial set of nodes may be executed at respective runtime environments (each belonging to an acceptable category of runtime environment indicated in the corresponding descriptor for the task, obtained earlier at the MLTOS), and the results of each of the tasks may be obtained at O1 in various embodiments (element 1110). In scenarios in which multiple categories of runtime environments are acceptable for a given task, the specific runtime environment category used may be selected for example by O1 based on factors such as the identity of the submitter of AR1, preferences indicated for the task by the inference flow designer who implemented the task and provided the task's descriptor, availability of provider network resources for the runtime environments, and so on. In some embodiments, for example, respective pools of resources (e.g., compute instances at which software containers implementing the ML tasks can be run, thread pools of worker threads for running relatively simple ML tasks, etc.) may be set up in advance at the MLTOS, and resources from such pools may be chosen to implement the runtime environments needed for ML tasks in response to clients' analysis requests.

As individual tasks are run, metrics collected from the tasks (as identified in the task descriptors, and/or a default set of metrics collected by the MLTOS for ML tasks, such as latencies, data transfer rates, error rates etc.) may be transmitted from the runtime environments being used to one or more metrics analyzers of the MLTOS (element 1113). The metrics analyzer may be responsible, among other operations, for monitoring trends in the metrics over time (e.g., to determine how/if the metrics change as more and more requests of a particular category are processed), as well as for providing collected metrics to clients such as the inference flow designers who submitted the tasks in some embodiments. O1 may re-try or re-execute a given task if the task's retry criteria (also indicated in its descriptor) are satisfied in some embodiments, e.g., if a timeout expires before a result is obtained from the task.

As results from G1 nodes become available, O1 may utilize G1 to iteratively identify the next set of nodes whose tasks can be executed (potentially in parallel, depending on whether the tasks satisfy pure function semantics, and/or whether the input for the next set of tasks can be split into partitions which can be processed independently as shown in FIG. 4) (element 1116). O1 may transmit the results from the completed tasks to the tasks awaiting input. These types of O1-task-O1 interactions may be performed iteratively until all the relevant nodes of G1 have been executed and the results of the final set of nodes/tasks are available for inclusion in a response to AR1 in the depicted embodiment. O1 may then provide results of G1 to the AR1 requester (element 1119), e.g., either directly or via a front-end request handler of the kind shown in FIG. 7. Optionally, e.g., in response to programmatic requests from the designer of the inference flow represented by G1, a visualization of the execution of G1, in some cases indicating the kids of runtime environments used for each of the nodes, may be presented to one or more destinations (element 1122). Collected task-level and/or graph-level metrics and/or retry statistics indicating how many nodes had to be re-executed may also or instead be presented in various embodiments.

It is noted that in various embodiments, some of the operations shown in FIG. 10 and/or FIG. 11 may be implemented in a different order than that shown in the figure, or may be performed in parallel rather than sequentially. Additionally, some of the operations shown in FIG. 10 and/or FIG. 11 may not be required in one or more implementations.

Illustrative Computer System

Figure 12:
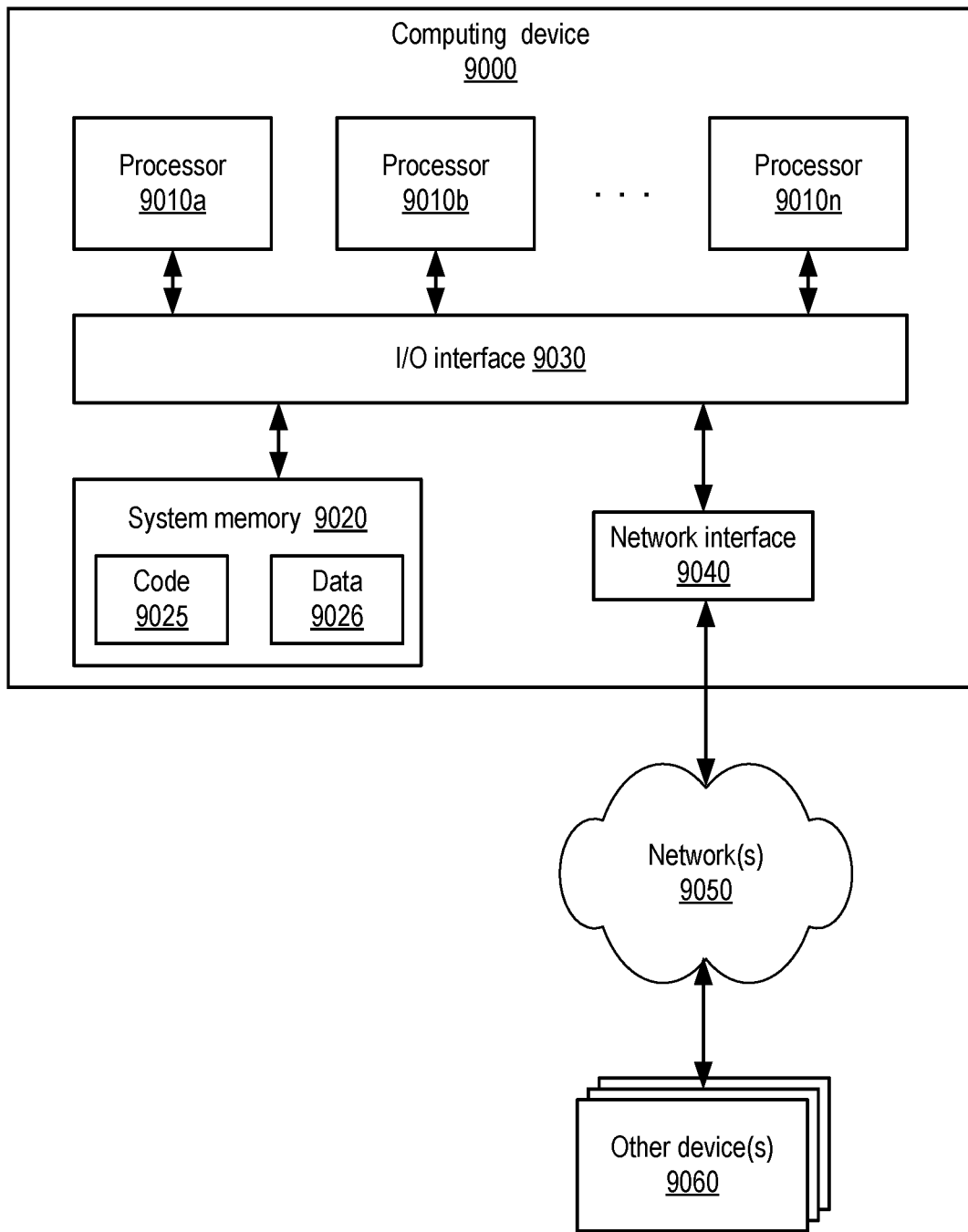
FIG. 12 is a block diagram illustrating an example computing device that may be used in at least some embodiments.

In at least some embodiments, a server that implements the types of techniques described herein (e.g., various functions of a machine learning task orchestration service and other network-accessible services similar to the services depicted in FIG. 9), may include a general-purpose computer system that includes or is configured to access one or more computer-accessible media. FIG. 12 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 11, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 11. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:

one or more computing devices;

wherein the one or more computing devices include instructions that upon execution on or across the one or more computing devices cause the one or more computing devices to:

obtain, via one or more programmatic interfaces, respective descriptors of a plurality of machine learning tasks to be run to respond to a content analysis request of a first type, wherein individual ones of the respective descriptors indicate (a) program code of a machine learning task, (b) one or more metrics to be collected with respect to the machine learning task, (c) one or more categories of runtime environments for executing the machine learning task, and (d) one or more retry criteria for the machine learning task;

store a graph representation of the plurality of machine learning tasks, wherein the graph comprises a plurality of nodes and a plurality of edges, wherein a first node of the plurality of nodes represents a first machine learning task, wherein a second node of the plurality of nodes represents a second machine learning task, and wherein an edge linking the first node to the second node indicates that an output data type of the first node is compatible with an input data type of the second node;

in response to determining that a particular content analysis request of the first type has been received, cause an orchestrator comprising one or more threads of execution to: (a) obtain a respective result from individual ones of the plurality of machine learning tasks, wherein a particular runtime environment at which an individual machine learning task is executed belongs to a category of the one or more categories indicated in the descriptor of the individual machine learning task, (b) in response to determining that a result of a particular machine learning task of the plurality of machine learning tasks satisfies a retry criterion indicated in the descriptor of the particular machine learning task, cause the particular machine learning task to be re-executed, (c) identify one or more machine learning tasks to which a result of the particular machine learning task is to be provided as input, (d) transmit the result of the particular machine learning task as input to individual ones of the one or more machine learning tasks, and (e) cause a response to the particular content analysis request to be transmitted to one or more destinations, wherein the response comprises results of at least some machine learning tasks of the plurality of machine learning tasks; and cause to be presented, via the one or more programmatic interfaces, (a) a visual representation of the graph, indicating respective categories of runtime environments utilized for individual ones of the plurality of machine learning tasks, (b) one or more metrics indicated in the descriptors of individual ones of the plurality of machine learning tasks and (c) one or more retry statistics indicative of a number of re-executions of individual ones of the machine learning tasks in accordance with respective retry criteria.

2. The system as recited in claim 1, wherein the one or more computing devices include further instructions that upon execution on or across the one or more computing devices further cause the one or more computing devices to:

dynamically select respective resources to be used for individual ones of the runtime environments at which the plurality of machine learning tasks are run in response to receiving the particular content analysis request, without receiving an indication of a particular resource to be used for a runtime environment of at least one machine learning task.

3. The system as recited in claim 1, wherein the one or more computing devices include further instructions that upon execution on or across the one or more computing devices further cause the one or more computing devices to:

determine, at the orchestrator, that a first machine learning task and a second machine learning task of the plurality of machine learning tasks can be run at least partly concurrently; and initiate, by the orchestrator, (a) the first machine learning task prior to completion of the second machine learning task and (b) the second machine learning task prior to completion of the first machine learning task.

4. The system as recited in claim 1, wherein the one or more computing devices include further instructions that upon execution on or across the one or more computing devices further cause the one or more computing devices to:

obtain, via the one or more programmatic interfaces, an indication of a plurality of versions of a first machine learning task of the plurality of machine learning tasks, including a first version and a second version;

provide, by the orchestrator, (a) a first copy of an input of the first machine learning task to the first version executing at a first runtime environment and (b) a second copy of an input of the first machine learning task to the second version executing at a second runtime environment; and select, based on one or more metrics obtained from the first and second versions, a particular version of the first machine learning task as a primary version to be used for one or more additional content analysis requests of the first type.

5. The system as recited in claim 1, wherein the one or more computing devices include further instructions that upon execution on or across the one or more computing devices further cause the one or more computing devices to:

in response to determining that the particular content analysis request of the first type has been received, cause a first machine learning task of the plurality of machine learning tasks to be executed at a runtime environment of a first category; and cause a second machine learning task of the plurality of machine learning tasks to be executed at a runtime environment of a second category which differs from the first category.

6. A computer-implemented method, comprising:

obtaining, via one or more programmatic interfaces, respective descriptors of a plurality of machine learning tasks to be executed to respond to an analysis request of a first type, wherein individual ones of the respective descriptors include (a) one or more metrics to be collected with respect to a corresponding machine learning task and (b) one or more categories of runtime environments for executing the corresponding machine learning task;

in response to determining that a particular analysis request of the first type has been received, causing an orchestrator to: (a) obtain a respective result from individual ones of the plurality of machine learning tasks, wherein a particular runtime environment at which an individual machine learning task is executed belongs to a category of the one or more categories indicated in the descriptor of the individual machine learning task, (b) identify a set of one or more machine learning tasks to which a result of another machine learning task is to be provided as input, (c) transmit the result of the other machine learning task as input to individual ones of the set of one or more machine learning tasks, and (d) cause a response to the particular analysis request to be transmitted to one or more destinations, wherein the response comprises results of one or more machine learning tasks of the plurality of machine learning tasks; and causing to be presented, via the one or more programmatic interfaces, (a) a visual representation of the plurality of machine learning tasks, indicating respective categories of runtime environments utilized for individual ones of the plurality of machine learning tasks and (b) an indication of the one or more metrics.

7. The computer-implemented method as recited in claim 6, further comprising:
identifying, at the orchestrator based at least in part on one or more factors, that a first machine learning task and a second machine learning task of the plurality of machine learning tasks can be run at least partly concurrently; and
initiating, by the orchestrator, (a) the first machine learning task prior to completion of the second machine learning task and (b) the second machine learning task prior to completion of the first machine learning task.

8. The computer-implemented method as recited in claim 7, wherein the one or more factors comprise an indication that (a) the first machine learning task satisfies a pure function criterion and (b) that the second machine learning task satisfies a pure function criterion.

9. The computer-implemented method as recited in claim 7, wherein the one or more factors comprise a determination that (a) the first machine learning task consumes an output of another machine learning task of the plurality of machine learning tasks as input and (b) the second machine learning task consumes the output of the other machine learning task as input.

10. The computer-implemented method as recited in claim 7 wherein the one or more factors comprise a determination that (a) output of another machine learning task comprises a plurality of objects of a particular data type, (b) the first machine learning task consumes an object of the particular data type as input and (c) the second machine learning task consumes an object of the particular data type as input.

11. The computer-implemented method as recited in claim 6, wherein a descriptor of a particular machine learning task of the plurality of machine learning tasks includes a retry criterion for the particular machine learning task, the computer-implemented method further comprising:
in response to determining, by the orchestrator, that a result of the particular machine learning task of the plurality of machine learning tasks satisfies the retry criterion, cause the particular machine learning task to be re-executed.

12. The computer-implemented method as recited in claim 6, further comprising:

obtaining, via the one or more programmatic interfaces, an indication of a plurality of versions of a first machine learning task of the plurality of machine learning tasks, including a first version and a second version;
providing, by the orchestrator, (a) a first copy of an input of the first machine learning task to the first version executing at a first runtime environment and (b) a second copy of an input of the first machine learning task to the second version executing at a second runtime environment; and
selecting, based on one or more metrics obtained from the first and second versions, a particular version of the first machine learning task as a primary version to be used for one or more additional analysis requests of the first type.

13. The computer-implemented method as recited in claim 6, further comprising:
presenting, via the one or more programmatic interfaces, access to a collection of machine learning tasks available for use by clients of an orchestration service for one or more analysis requests, wherein at least one machine learning task of the plurality of machine learning tasks is selected from the collection.

14. The computer-implemented method as recited in claim 6, wherein a category of runtime environment of the one or more categories comprises one of: (a) a thread of execution at a host at which an orchestrator identified for the analysis request is run, (b) a virtual machine, (c) a software container, or (d) a resource of a network-accessible service of a provider network.

15. The computer-implemented method as recited in claim 6, further comprising:
dynamically selecting, by an orchestration service of a provider network, from a pool of resources of the provider network, respective resources to be used for individual ones of the runtime environments at which the plurality of machine learning tasks are run in response to determining that the particular analysis request of the first type has been received, without receiving an indication of a particular resource to be used for a particular machine learning task.

16. One or more non-transitory computer-accessible storage media storing program instructions that when executed on or across one or more processors cause the one or more processors to:
obtain, via one or more programmatic interfaces, respective descriptors of a plurality of machine learning tasks to be executed to respond to an analysis request of a first type, wherein individual ones of the respective descriptors include (a) one or more metrics to be collected with respect to a corresponding machine learning task and (b) one or more categories of runtime environments for executing the corresponding machine learning task;
in response to determining that a particular analysis request of the first type has been received,
cause an orchestrator to: (a) obtain a respective result from individual ones of the plurality of machine learning tasks, wherein a particular runtime environment at which an individual machine learning task is executed belongs to a category of the one or more categories indicated in the descriptor of the individual machine learning task, (b) identify a set of one or more machine learning tasks to which a result of another machine learning task is to be provided as input, (c) transmit the result of the other machine learning task as input to individual ones of the set of one or more machine learning tasks, and (d) cause a response to the particular analysis request to be transmitted to one or more destinations, wherein the response comprises results of one or more machine learning tasks of the plurality of machine learning tasks; and cause to be presented, via the one or more programmatic interfaces, (a) a visual representation of the plurality of machine learning tasks, indicating respective categories of runtime environments utilized for individual ones of the plurality of machine learning tasks, and (b) an indication of the one or more metrics.

17. The one or more non-transitory computer-accessible storage media as recited in claim 16, wherein a metric of the one or more metrics comprises one of: (a) a response time, (b) a resource utilization level, (c) a number of bytes transferred, or (d) a confidence level of an inference.

18. The one or more non-transitory computer-accessible storage media as recited in claim 16, wherein the analysis request of the first type comprises one or more of: (a) a request to extract text from an image of a document, (b) a request to identify an entity from an image or video, (c) a request to detect contents of an utterance from an audio segment.

19. The one or more non-transitory computer-accessible storage media as recited in claim 16, storing further program instructions that when executed on or across one or more processors further cause the one or more processors to:

determine, at the orchestrator, that a first machine learning task and a second machine learning task of the plurality of machine learning tasks can be run at least partly in parallel; and initiate, by the orchestrator, (a) the first machine learning task prior to completion of the second machine learning task and (b) the second machine learning task prior to completion of the first machine learning task.

20. The one or more non-transitory computer-accessible storage media as recited in claim 16, storing further program instructions that when executed on or across one or more processors further cause the one or more processors to:

dynamically select respective resources to be used for individual ones of the runtime environments at which the plurality of machine learning tasks are run in response to determining that the particular analysis request of the first type has been received, without receiving an indication of a particular resource to be used for a particular machine learning task.

* * * * *